(12) United States Patent
Yamamoto

(10) Patent No.: US 12,504,610 B2
(45) Date of Patent: Dec. 23, 2025

(54) ZOOM OPTICAL SYSTEM, OPTICAL APPARATUS AND METHOD FOR MANUFACTURING THE ZOOM OPTICAL SYSTEM

(71) Applicant: Nikon Corporation, Tokyo (JP)

(72) Inventor: Hiroshi Yamamoto, Kawasaki (JP)

(73) Assignee: Nikon Corporation, Tokyo (JP)

( * ) Notice: Subject to any disclaimer, the term of this patent is extended or adjusted under 35 U.S.C. 154(b) by 557 days.

(21) Appl. No.: 17/793,950

(22) PCT Filed: Nov. 11, 2020

(86) PCT No.: PCT/JP2020/042054
§ 371 (c)(1),
(2) Date: Jul. 20, 2022

(87) PCT Pub. No.: WO2021/149335
PCT Pub. Date: Jul. 29, 2021

(65) Prior Publication Data
US 2023/0059659 A1    Feb. 23, 2023

(30) Foreign Application Priority Data

Jan. 20, 2020  (JP) ................ 2020-007089

(51) Int. Cl.
*G02B 15/14* (2006.01)
*G02B 15/20* (2006.01)
*G02B 27/00* (2006.01)

(52) U.S. Cl.
CPC ......... *G02B 15/1461* (2019.08); *G02B 15/20* (2013.01); *G02B 27/0025* (2013.01)

(58) Field of Classification Search
CPC ............... G02B 15/1461; G02B 15/20; G02B 27/0025; G02B 13/18; G02B 15/144105;
(Continued)

(56) References Cited

U.S. PATENT DOCUMENTS 5,241,421 A * 8/1993 Endo .................. G02B 15/1421
359/683
2014/0139722 A1* 5/2014 Sugita ............ G02B 15/145113
359/684
(Continued)

FOREIGN PATENT DOCUMENTS

JP     H03-225308 A    10/1991
JP     2014-102462 A    6/2014

OTHER PUBLICATIONS

Office Action issued Mar. 7, 2023, in Japanese Patent Application No. 2021-572977.
(Continued)

*Primary Examiner* — Bumsuk Won
*Assistant Examiner* — Alex Park Rickel
(74) *Attorney, Agent, or Firm* — Potomac Law Group, PLLC

(57) ABSTRACT

A zoom optical system consists of, in order from an object on an optical axis: a first lens group having a positive refractive power; a second lens group having a negative refractive power; and a rear group that includes a plurality of lens groups. The rear group comprises a first focusing lens group having a positive refractive power, and a second focusing lens group having a negative refractive power. Upon zooming from a wide angle end to a telephoto end, distances between lens groups adjacent to each other among the first lens group, the second lens group, and the plurality of lens groups, change. Upon focusing from an infinity object to a short distance object, the first focusing lens group
(Continued)

and the second focusing lens group move toward an image along movement trajectories different from each other. The following conditional expression is satisfied, $$1.10 < f2/fF2 < 2.00$$

where f2: a focal length of the second lens group, and fF2: a focal length of the second focusing lens group.

16 Claims, 30 Drawing Sheets

(58) Field of Classification Search
CPC ........ G02B 15/1451; G02B 15/145105; G02B 15/145109; G02B 15/145111; G02B 15/145113; G02B 15/145115
USPC ........................................ 359/676, 684, 695
See application file for complete search history.

(56) References Cited

U.S. PATENT DOCUMENTS

2019/0369371 A1* 12/2019 Katou ............ G02B 15/145515
2020/0233191 A1* 7/2020 Ichimura ............ G02B 15/1461

OTHER PUBLICATIONS

International Search Report from International Patent Application No. PCT/JP2020/042054, Dec. 22, 2020.
Office Action issued Apr. 2, 2024, in Japanese Patent Application No. 2023-082080.
Office Action issued Apr. 14, 2023, in Chinese Patent Application No. 202080092939.9.
International Preliminary Report on Patentability from International Patent Application No. PCT/JP2020/042054, Aug. 4, 2022.

* cited by examiner

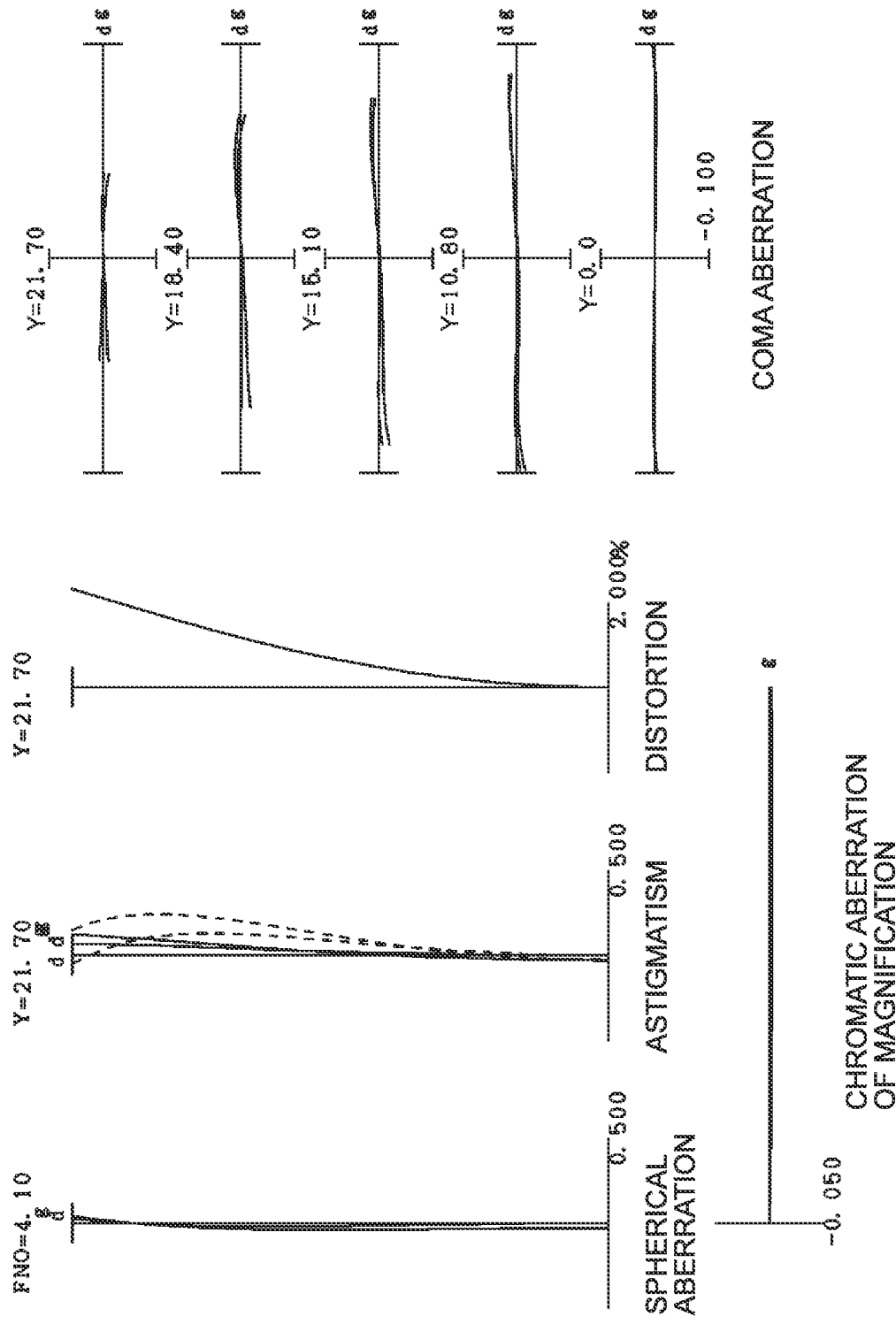

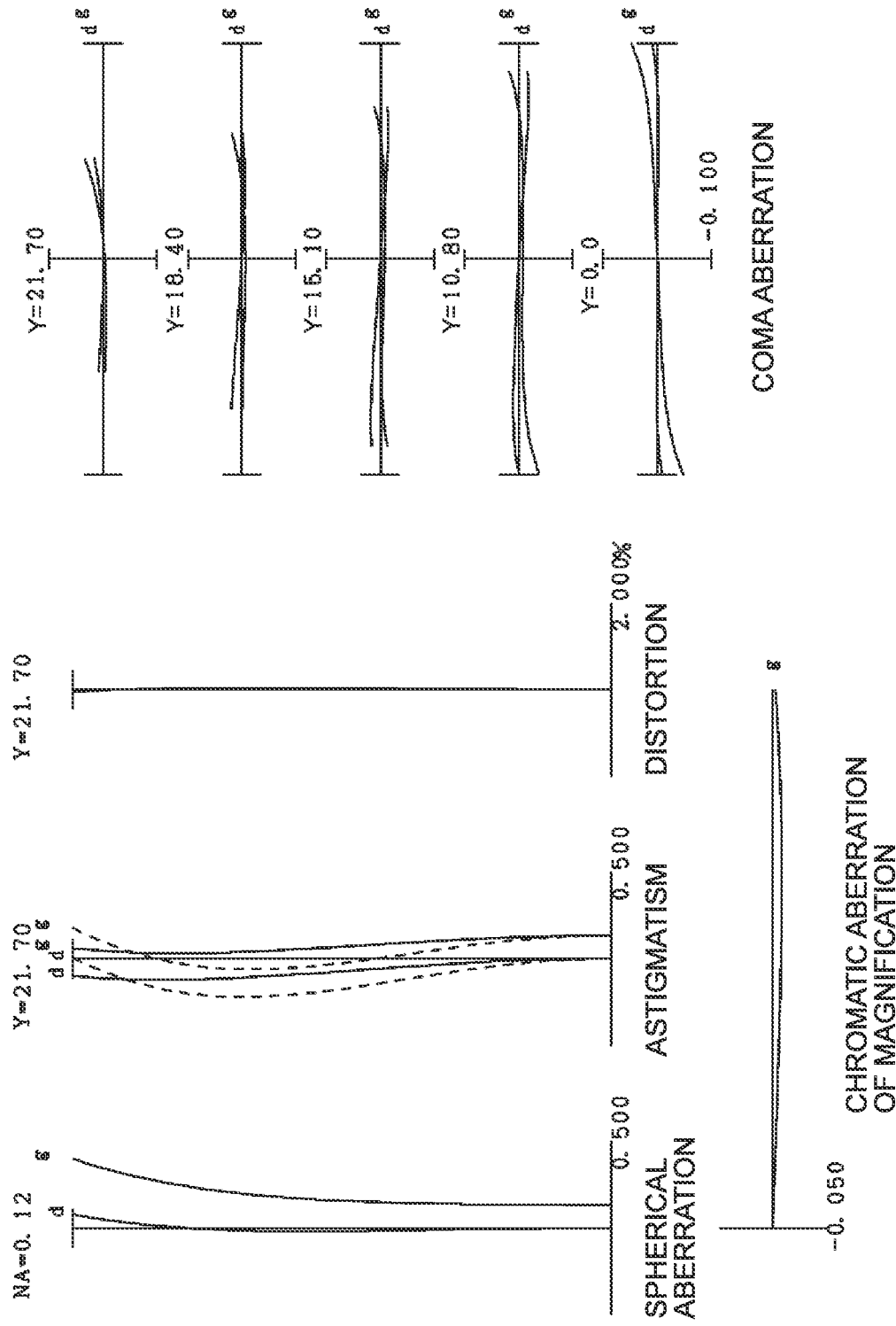

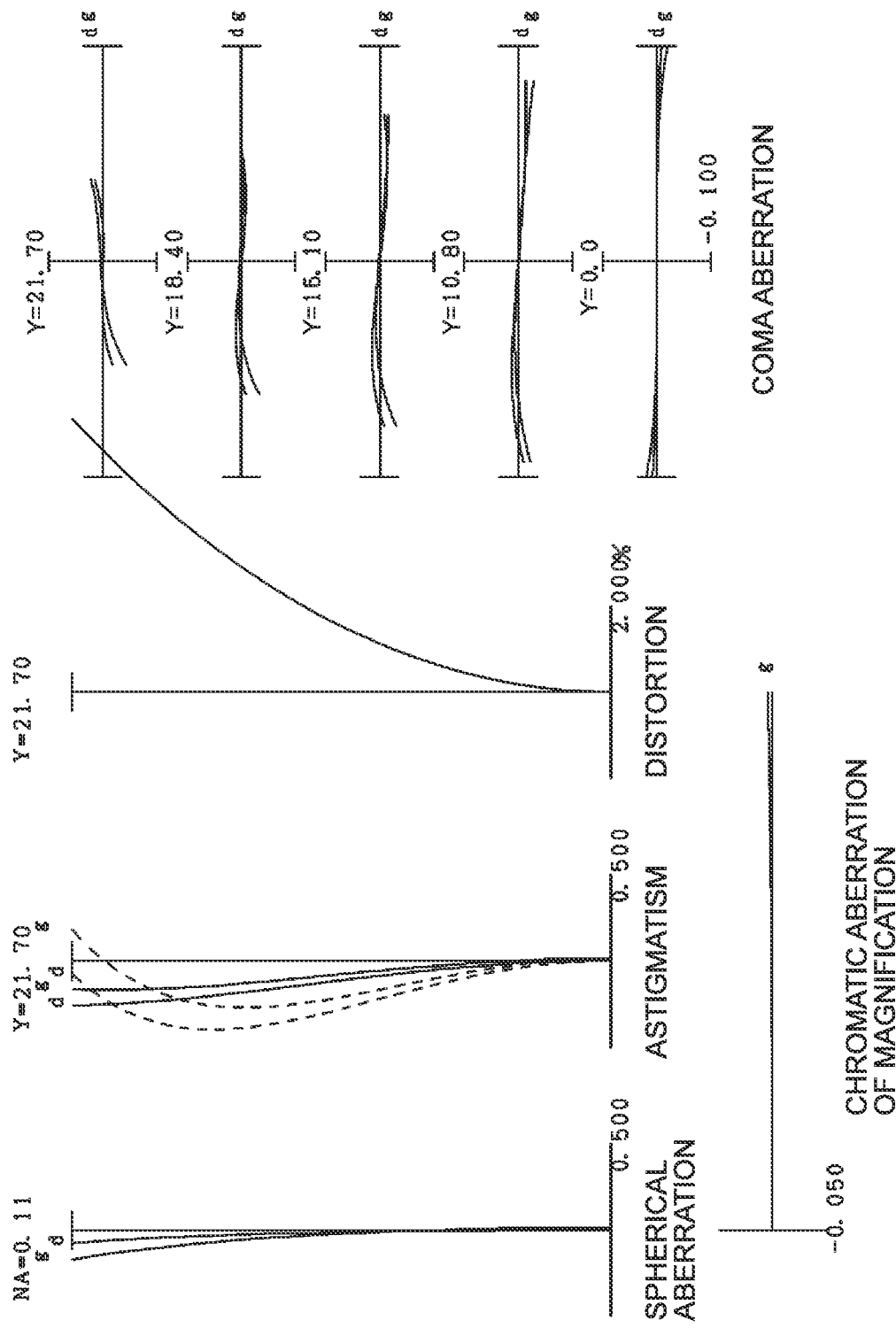

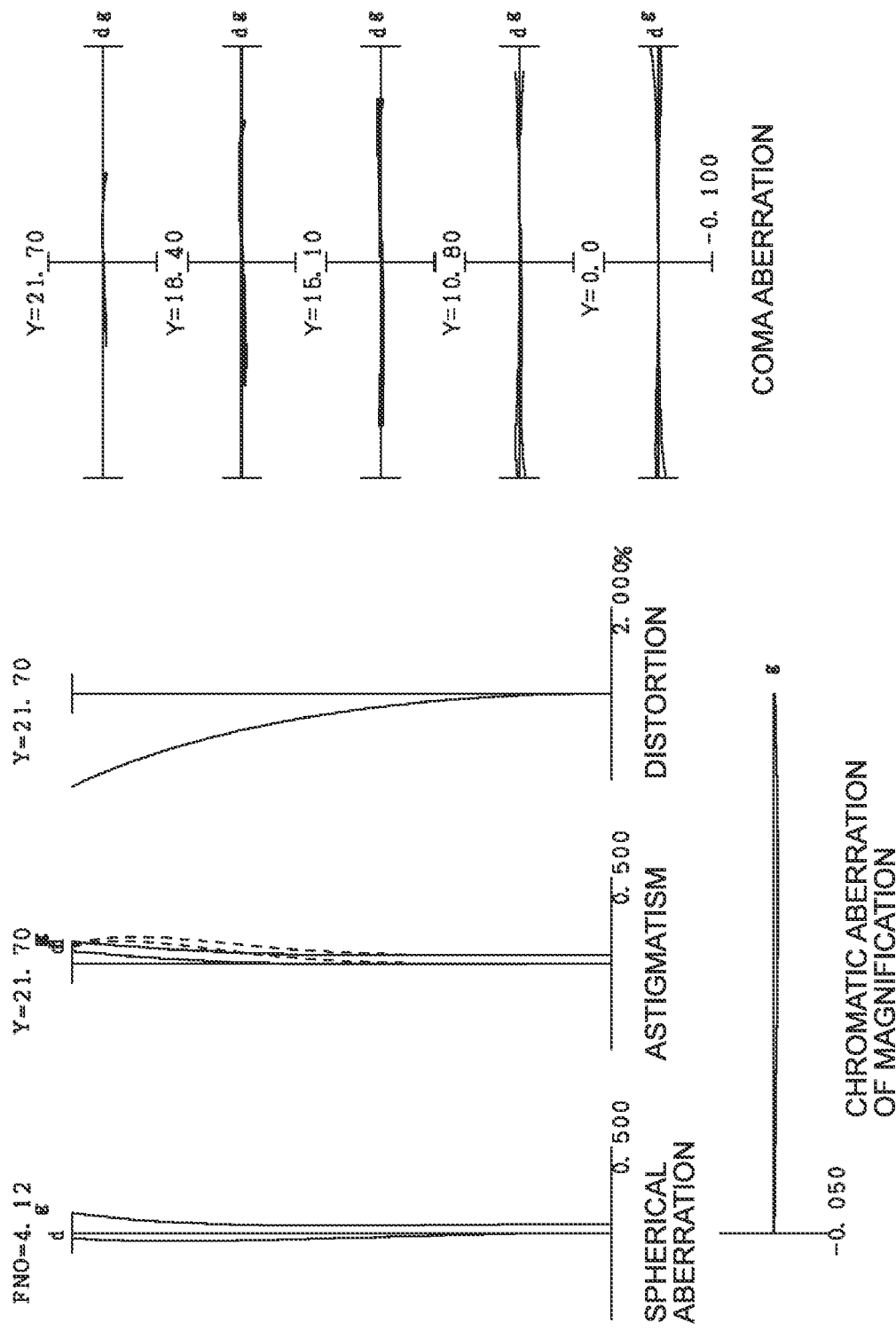

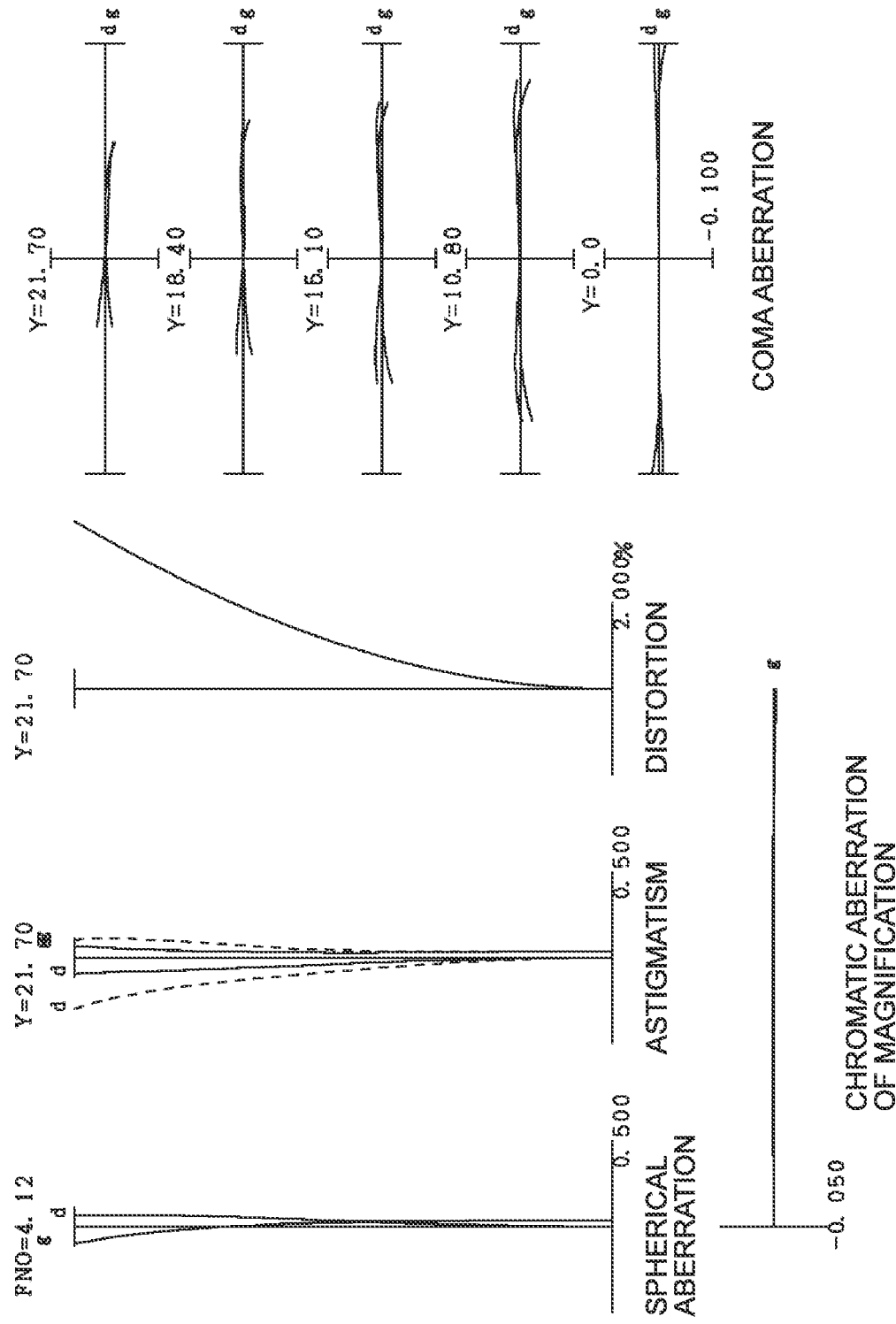

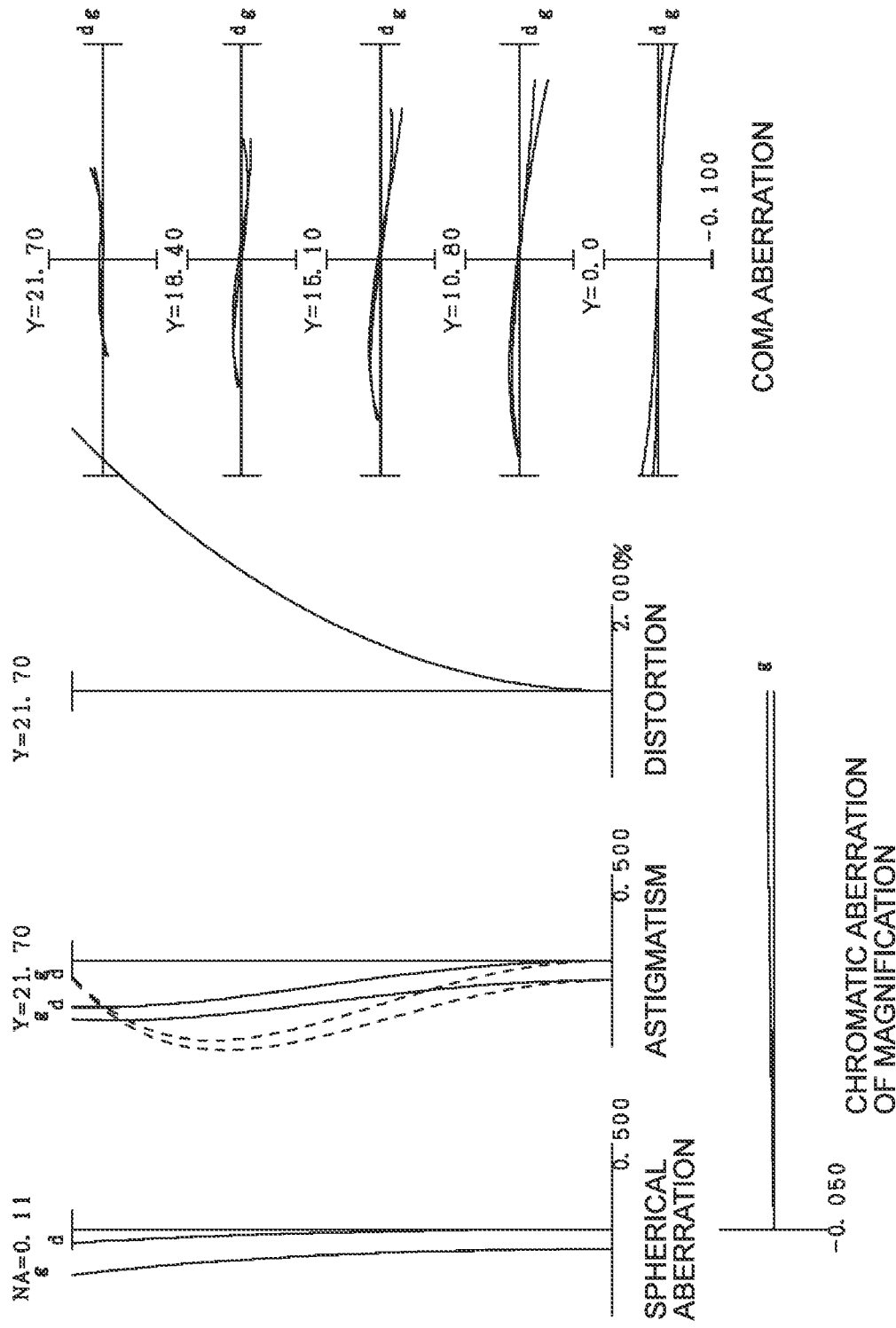

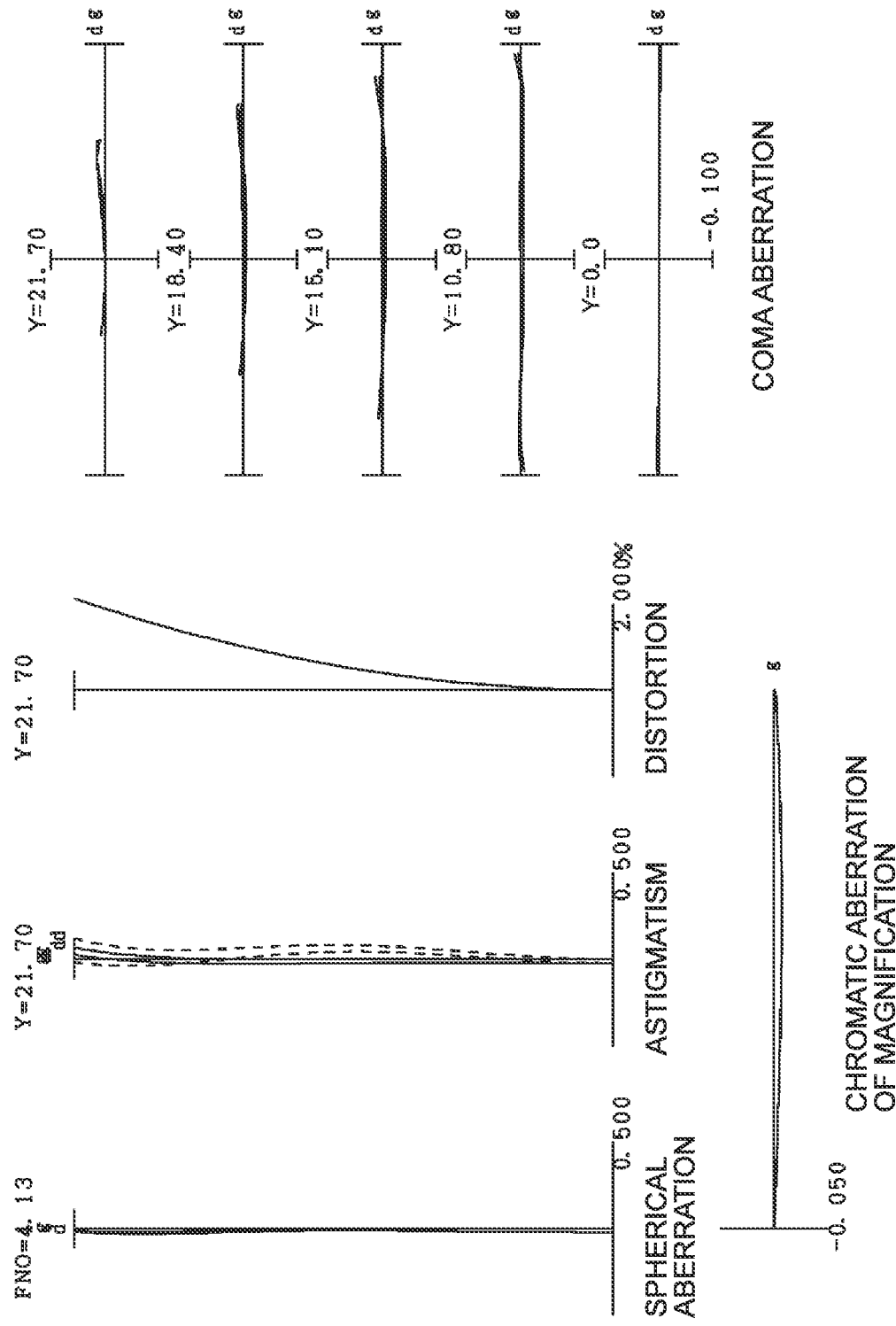

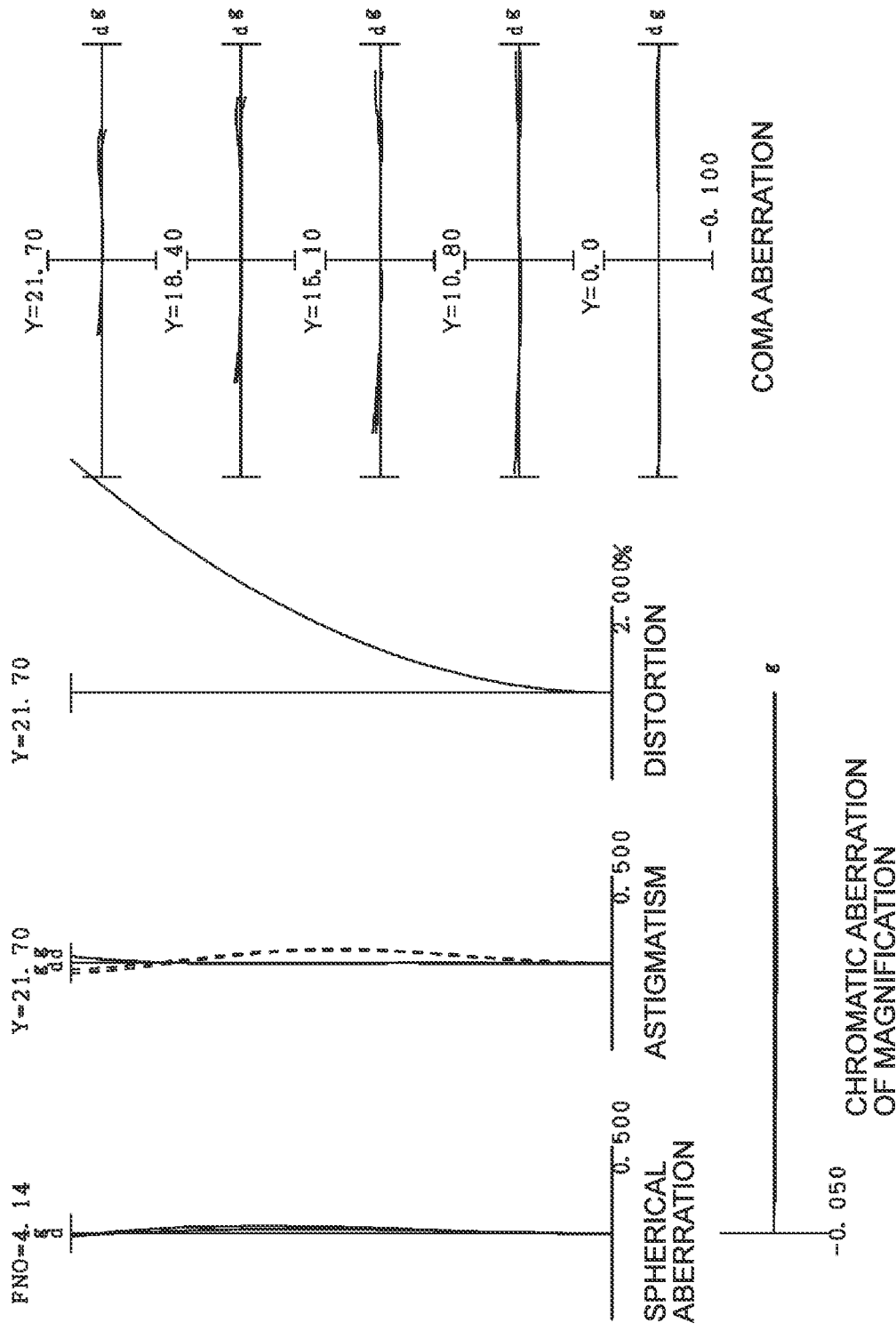

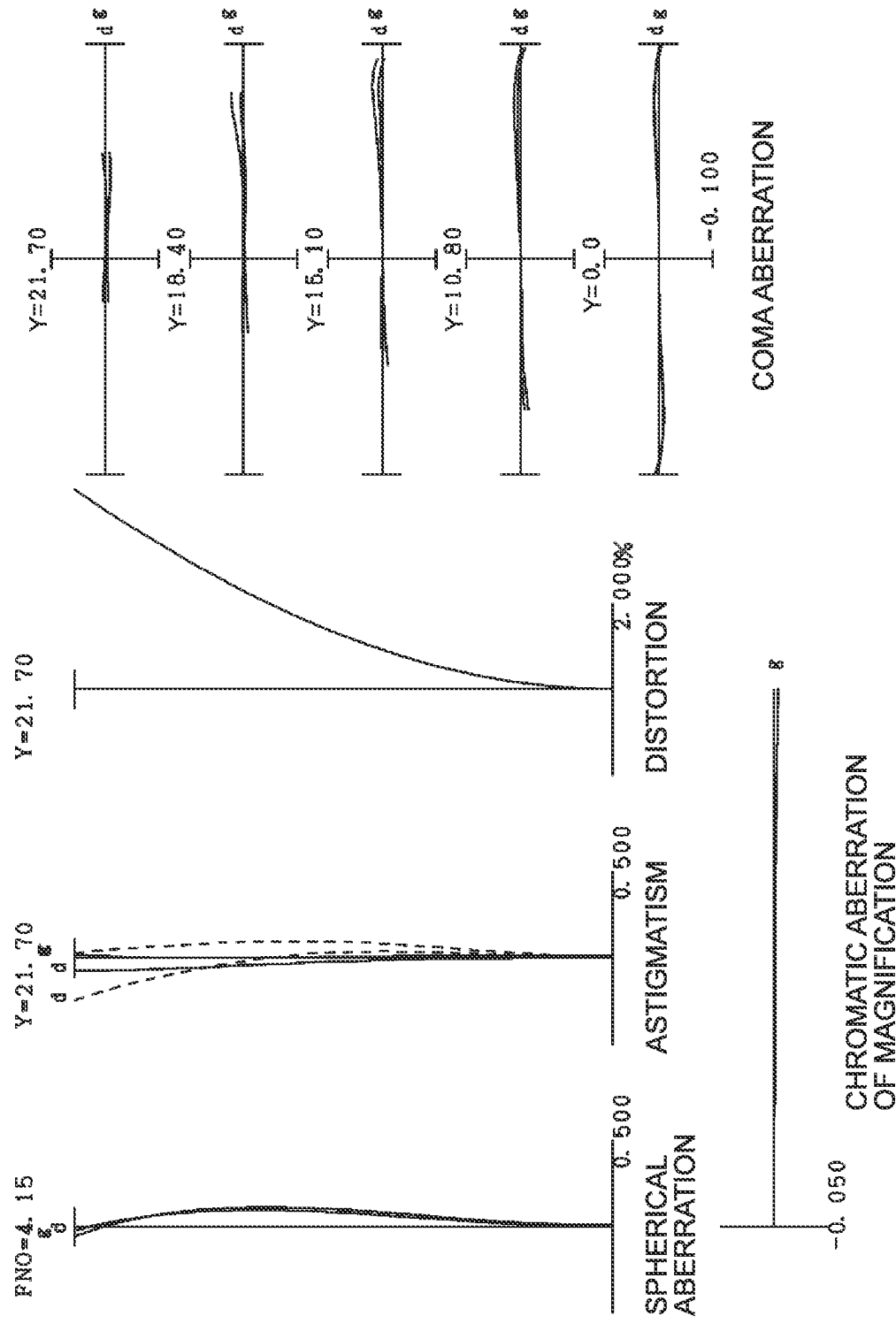

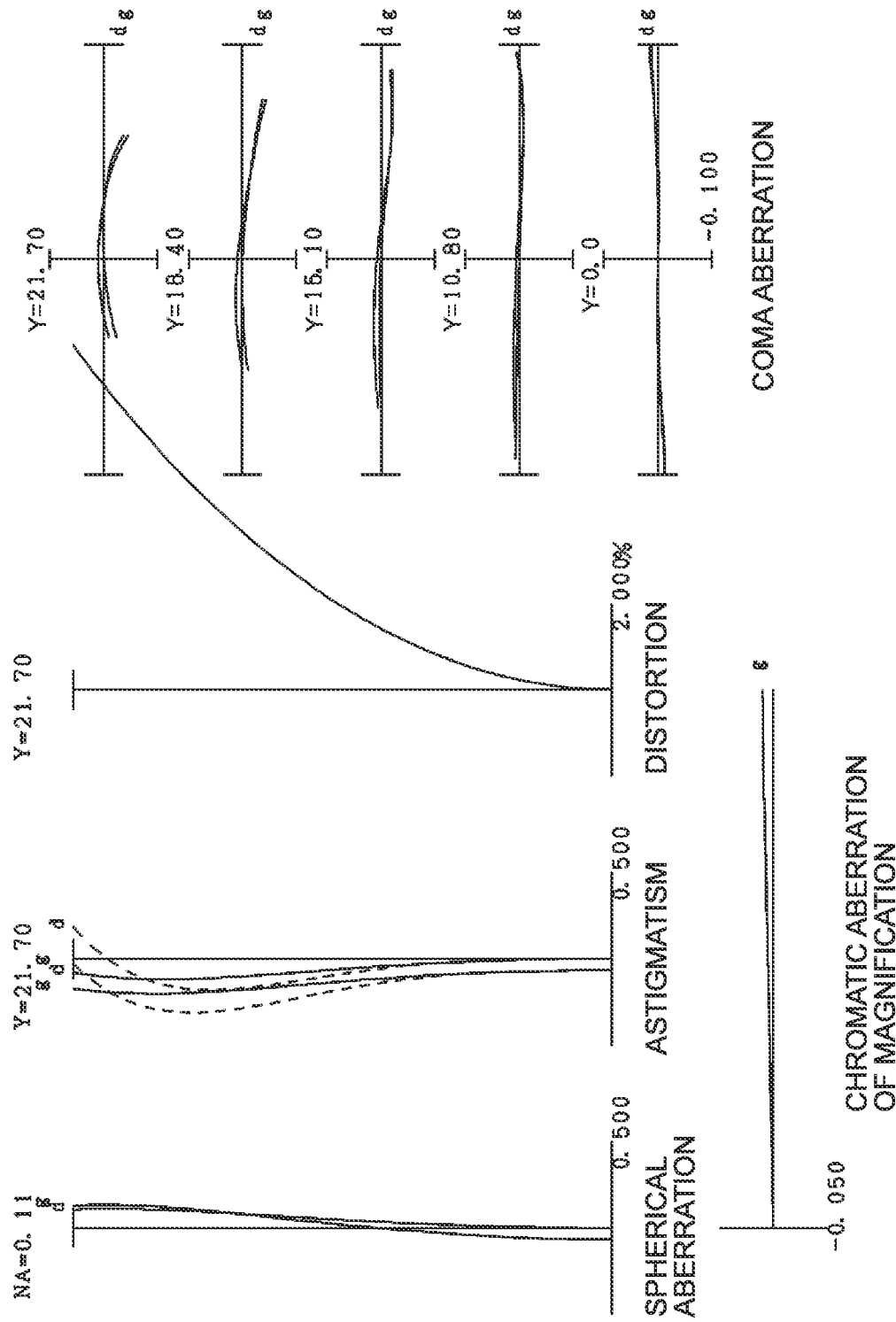

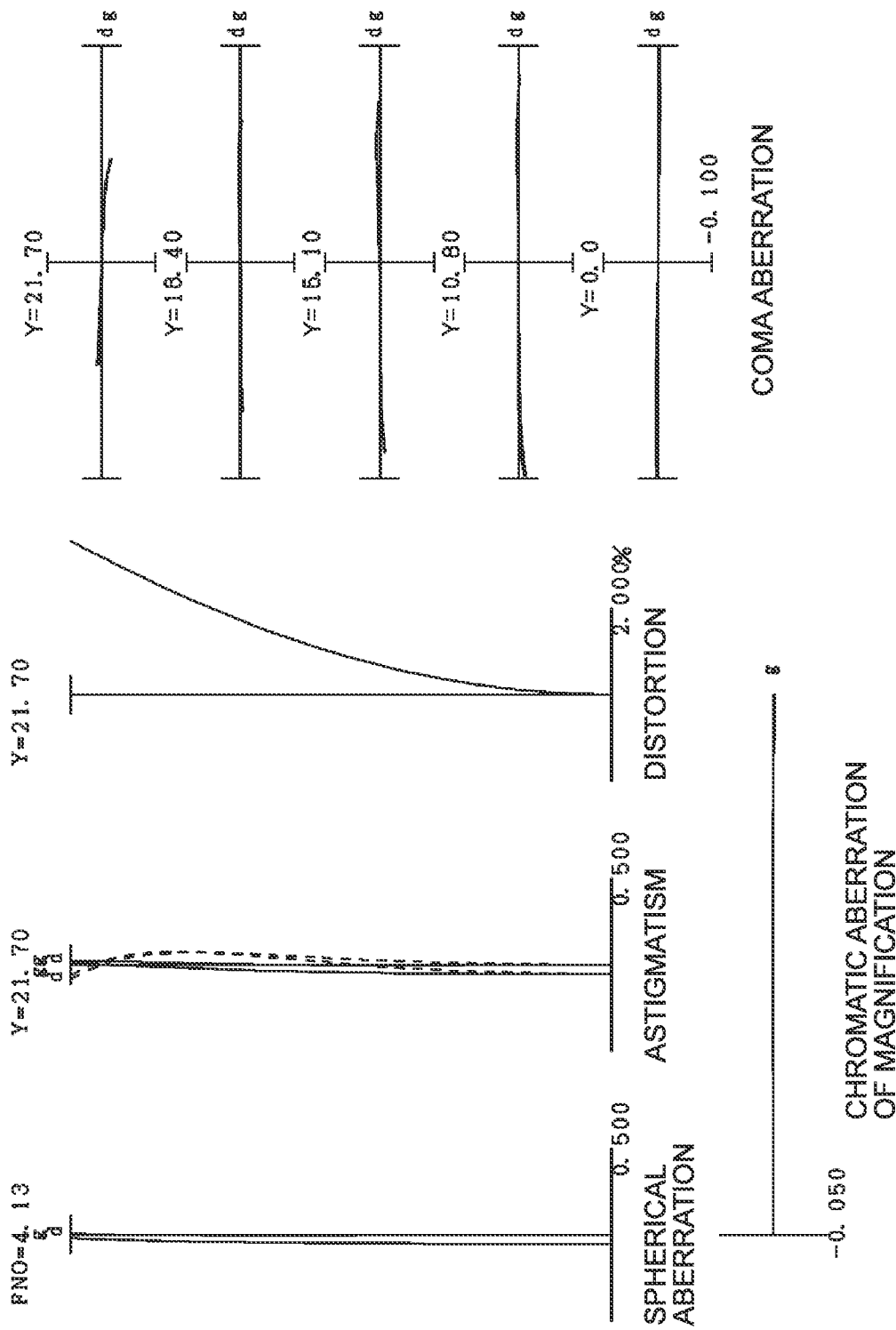

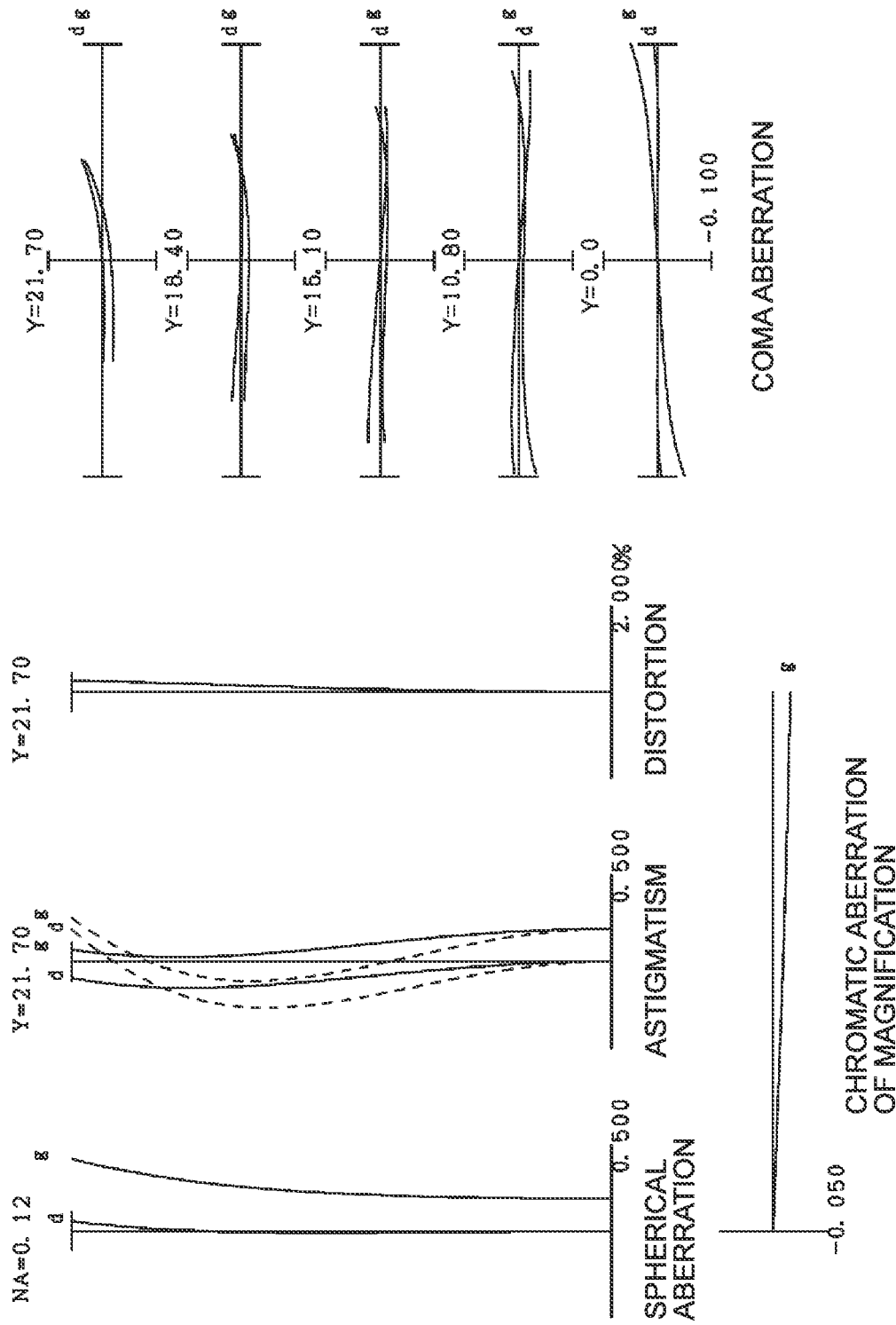

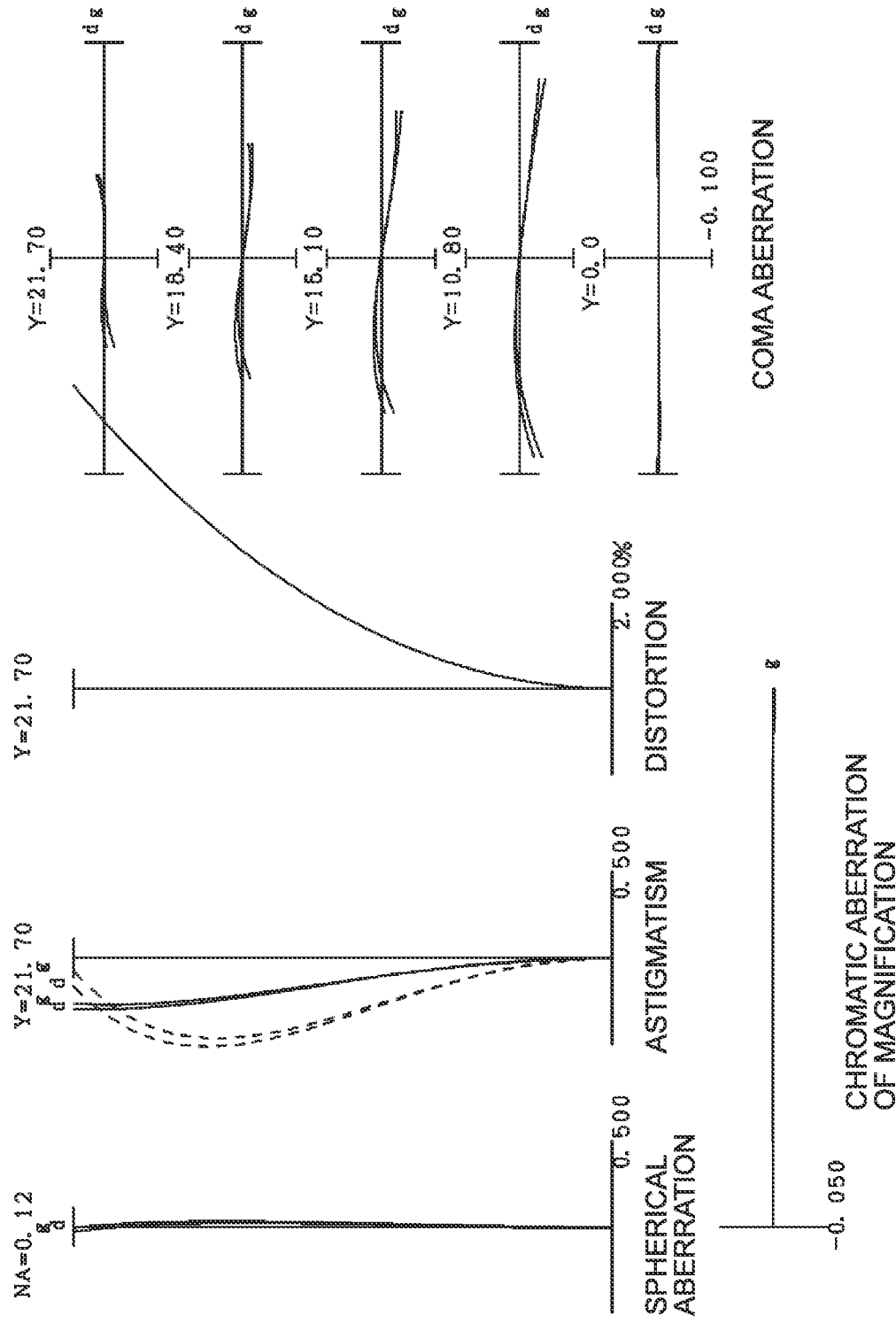

ZOOM OPTICAL SYSTEM, OPTICAL APPARATUS AND METHOD FOR MANUFACTURING THE ZOOM OPTICAL SYSTEM

TECHNICAL FIELD

The present invention relates to a zoom optical system, an optical apparatus including the same, and a method for manufacturing the zoom optical system.

TECHNICAL BACKGROUND

Conventionally, zoom optical systems suitable for photographic cameras, electronic still cameras, video cameras and the like have been proposed (for example, see Patent Literature 1). Unfortunately, according to the conventional zoom optical systems, the weight reduction of focusing lens groups is insufficient, and it is difficult to suppress variation in various aberrations including the spherical aberration upon focusing from an infinity object to a short distance object.

PRIOR ARTS LIST

Patent Document

Patent Literature 1: Japanese Laid-Open Patent Publication No. 2014-102462(A)

SUMMARY OF THE INVENTION

A zoom optical system according to the present invention consists of, in order from an object on an optical axis: a first lens group having a positive refractive power; a second lens group having a negative refractive power; and a rear group that includes a plurality of lens groups, wherein the rear group comprises a first focusing lens group having a positive refractive power, and a second focusing lens group having a negative refractive power, upon zooming from a wide angle end to a telephoto end, distances between lens groups adjacent to each other among the first lens group, the second lens group, and the plurality of lens groups, change, upon focusing from an infinity object to a short distance object, the first focusing lens group and the second focusing lens group move toward an image along movement trajectories different from each other, and the following conditional expression is satisfied, $$1.10 < f2/fF2 < 2.00$$

where f2: a focal length of the second lens group, and
fF2: a focal length of the second focusing lens group.

An optical apparatus according to the present invention is configured to be mounted with the zoom optical system described above.

A method for manufacturing a zoom optical system consisting of, in order from an object on an optical axis: a first lens group having a positive refractive power; a second lens group having a negative refractive power; and a rear group that includes a plurality of lens groups, the method comprises a step of arranging the first lens group, the second lens group and the rear group in a lens barrel so that; the rear group comprises a first focusing lens group having a positive refractive power, and a second focusing lens group having a negative refractive power, upon zooming from a wide angle end to a telephoto end, distances between lens groups adjacent to each other among the first lens group, the second lens group, and the plurality of lens groups, change, upon focusing from an infinity object to a short distance object, the first focusing lens group and the second focusing lens group move toward an image along movement trajectories different from each other, and the following conditional expression is satisfied.

$$1.10 < f2/fF2 < 2.00$$

where f2: a focal length of the second lens group, and
fF2: a focal length of the second focusing lens group.

BRIEF DESCRIPTION OF THE DRAWINGS

FIGS. 2A, 2B and 2C are graphs respectively showing various aberrations of the zoom optical system according to the first example upon focusing on infinity in a wide-angle end state, an intermediate focal length state, and a telephoto end state;

FIGS. 3A, 3B and 3C are graphs respectively showing various aberrations of the zoom optical system according to the first example upon focusing on a short distance object in the wide-angle end state, the intermediate focal length state, and the telephoto end state;

FIGS. 5A, 5B and 5C are graphs respectively showing various aberrations of the zoom optical system according to the second example upon focusing on infinity in a wide-angle end state, an intermediate focal length state, and a telephoto end state;

FIGS. 6A, 6B and 6C are graphs respectively showing various aberrations of the zoom optical system according to the second example upon focusing on a short distance object in the wide-angle end state, the intermediate focal length state, and the telephoto end state;

FIGS. 8A, 8B and 8C are graphs respectively showing various aberrations of the zoom optical system according to the third example upon focusing on infinity in a wide-angle end state, an intermediate focal length state, and a telephoto end state;

FIGS. 9A, 9B and 9C are graphs respectively showing various aberrations of the zoom optical system according to the third example upon focusing on a short distance object in the wide-angle end state, the intermediate focal length state, and the telephoto end state;

FIGS. 11A, 11B and 11C are graphs respectively showing various aberrations of the zoom optical system according to the fourth example upon focusing on infinity in a wide-angle end state, an intermediate focal length state, and a telephoto end state;

FIGS. 12A, 12B and 12C are graphs respectively showing various aberrations of the zoom optical system according to the fourth example upon focusing on a short distance object in the wide-angle end state, the intermediate focal length state, and the telephoto end state;

DESCRIPTION OF THE EMBODIMENTS

Figure 14:
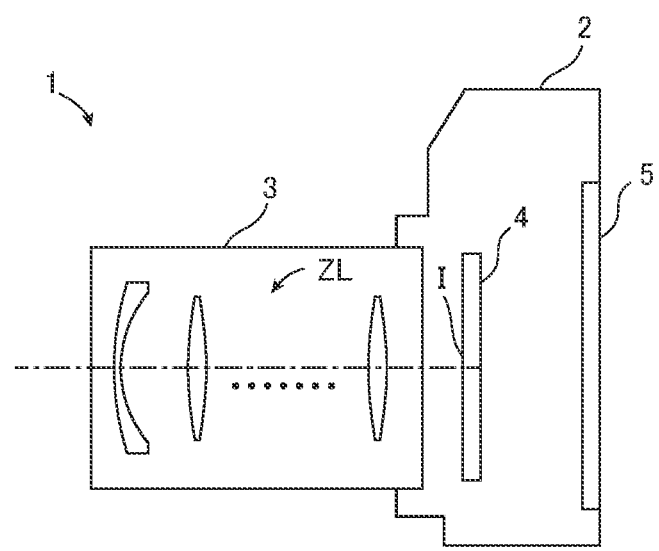
FIG. 14 shows a configuration of a camera that includes the zoom optical system according to this embodiment.

Hereinafter, preferable embodiments according to the present invention are described. First, a camera (optical apparatus) that includes a zoom optical system according to each embodiment is described with reference to FIG. 14. As shown in FIG. 14, this camera 1 includes a main body 2, and a photographing lens 3 attached to the main body 2. The main body 2 includes an imaging element 4, a main body control part (not shown) that controls the operation of the digital camera, and a liquid crystal operation screen 5. The photographing lens 3 includes an optical system ZL that includes a plurality of lens groups, and a lens position control mechanism (not shown) that controls the position of each lens group. The lens position control mechanism includes a sensor that detects the position of each lens group, a motor that moves each lens group forward and backward on the optical axis, and a control circuit that drives the motor.

Light from a photographic subject is condensed by the optical system ZL of the photographing lens 3, and reaches an image surface I of the imaging element 4. The light having reached the image surface I from the photographic subject is photoelectrically converted by the imaging element 4, and is recorded as digital image data in a memory, not shown. The digital image data recorded in the memory is allowed to be displayed on the liquid crystal screen 5 according to an operation by a user. Note that this camera may be a mirrorless camera, or a single-lens reflex camera that includes a quick return mirror.

Figure 1:
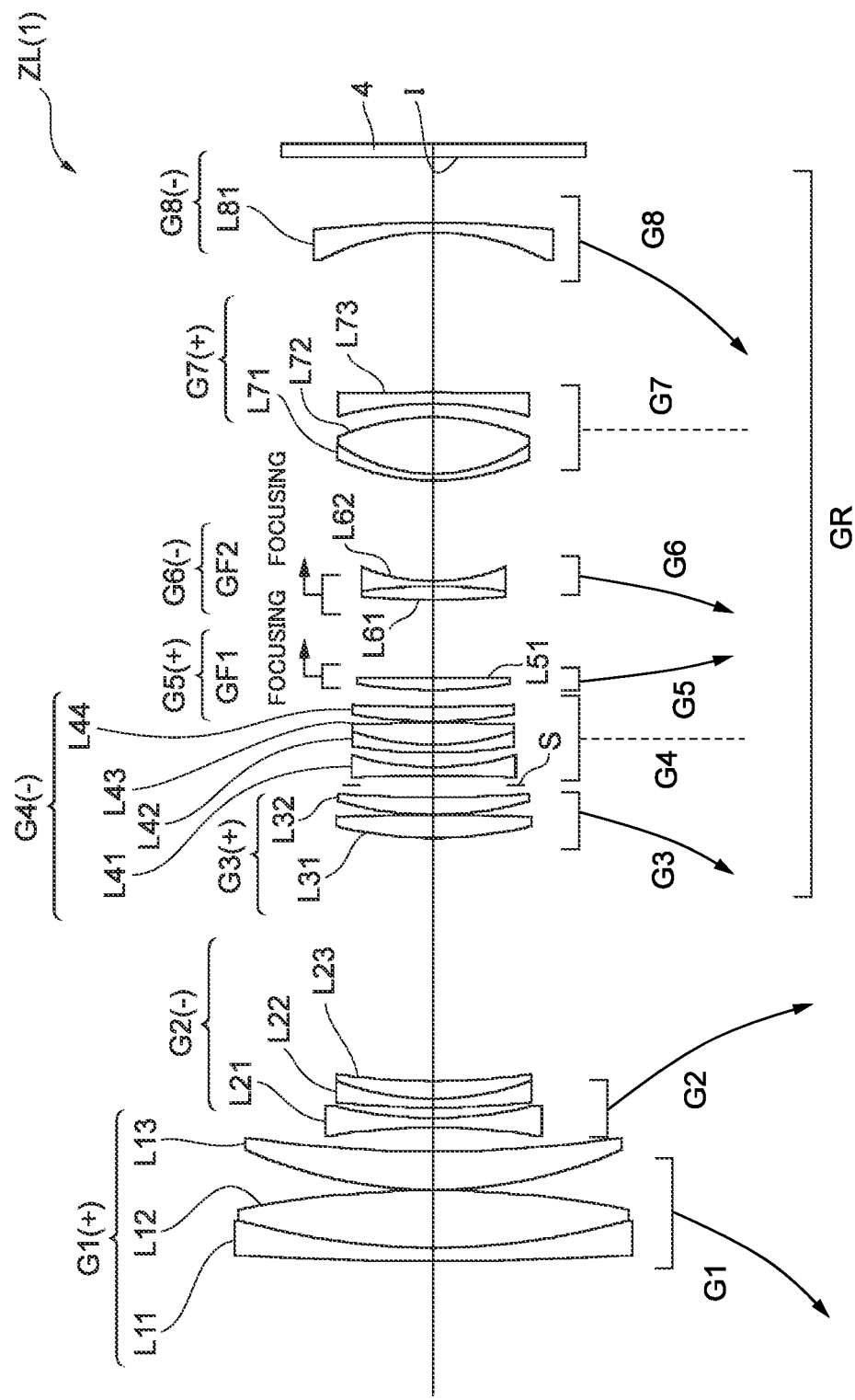
FIG. 1 shows a lens configuration of a zoom optical system according to a first example.

Next, the zoom optical system (photographing lens 3) according to this embodiment is described. As shown in FIG. 1, the zoom optical system ZL(1) that is an example of the zoom optical system (zoom lens) ZL according to this embodiment consists of, in order from an object on an optical axis: a first lens group G1 having a positive refractive power; a second lens group G2 having a negative refractive power; and a rear group GR, wherein the rear group GR comprises a first focusing lens group GF1 having a positive refractive power (including, for example, a fifth lens group G5), and a second focusing lens group GF2 having a negative refractive power (including, for example, a sixth lens group G6). Upon zooming from a wide angle end to a telephoto end, distances between lens groups adjacent to each other among the first lens group G1, the second lens group G2, and the plurality of lens groups constituting the rear group GR, change. Furthermore, upon focusing from an infinity object to a short distance object, the first focusing lens group GF1 and the second focusing lens group GF2 move toward an image along movement trajectories different from each other.

Preferably, in this zoom optical system ZL, the following conditional expression (1) is satisfied, $$1.10 < f2/fF2 < 2.00 \quad (1)$$

where f2: a focal length of the second lens group, and
fF2: a focal length of the second focusing lens group.

The conditional expression (1) defines the ratio between the focal lengths of the second lens group G2 and the second focusing lens group GF2. By satisfying the conditional expression (1), the variation in various aberrations including the spherical aberration and the curvature of field upon focusing from the infinity object to the short distance object can be favorably suppressed. To further secure the advantageous effects of this embodiment, it is preferable to set the upper limit value of the conditional expression (1) to 1.85, 1.70, 1.60, 1.55, 1.50, 1.45, or 1.42, for example. It is preferable to set the lower limit value of the conditional expression (1) to 1.12, 1.14, 1.15, 1.16, 1.18, or 1.19, for example.

Preferably, in the zoom optical system described above, the following conditional expression (2) is satisfied, $$0.30 < f1/fF1 < 2.50 \quad (2)$$

where f1: a focal length of the first lens group, and
fF1: a focal length of the first focusing lens group.

The conditional expression (2) defines the ratio between the focal lengths of the first lens group G1 and the first focusing lens group GF1. By satisfying the conditional expression (2), the variation in various aberrations including the spherical aberration and the curvature of field upon focusing from the infinity object to the short distance object can be favorably suppressed. To further secure the advantageous effects of this embodiment, it is preferable to set the upper limit value of the conditional expression (2) to 2.45, 2.40, 2.35, 2.30, 2.25, 2.20, 2.15, 2.10, or 2.05, for example. It is preferable to set the lower limit value of the conditional expression (2) to 0.50, 0.75, 1.00, 1.15, 1.30, 1.40, 1.45, 1.50, or 1.55, for example.

Preferably, in the zoom optical system described above, the first focusing lens group GF1 consists of one positive lens. Accordingly, the lens barrel can be reduced in size, and various aberrations including the spherical aberration upon focusing can be effectively suppressed.

Preferably, in the zoom optical system described above, the following conditional expression (3) is satisfied, $$0.60 < fr/fF2 < 3.00 \quad (3)$$

where fr: a focal length of a lens group closest to the image.

The conditional expression (3) defines the ratio between the focal lengths of the lens group closest to the image and the second focusing lens group GF2. By satisfying the conditional expression (3), the variation in various aberrations including the spherical aberration upon focusing from the infinity object to the short distance object can be suppressed. To further secure the advantageous effects of this embodiment, it is preferable to set the upper limit value of the conditional expression (3) to 2.85, 2.70, 2.55, 2.40, 2.25, 2.10, 2.00, 1.95, or 1.92, for example. It is preferable to set the lower limit value of the conditional expression (3) to 0.75, 0.85, 0.93, 1.00, 1.05, 1.10, 1.15, or 1.20, for example.

Preferably, in the zoom optical system described above, the following conditional expression (4) is satisfied, $$1.30 < fF1/(-fF2) < 10.00 \quad (4)$$

The conditional expression (4) defines the ratio between the focal lengths of the first focusing lens group GF1 and the second focusing lens group GF2. By satisfying the conditional expression (4), the variation in the various aberrations including the spherical aberration upon focusing from the infinity object to the short distance object can be favorably suppressed. To further secure the advantageous effects of this embodiment, it is preferable to set the upper limit value of the conditional expression (4) to 8.50, 7.00, 5.50, 4.50, 4.00, 3.50, 3.00, 2.50, or 2.30, for example. It is preferable to set the lower limit value of the conditional expression (4) to 1.35, 1.40, 1.45, 1.50, 1.55, 1.60, 1.63, or 1.65, for example.

Preferably, in the zoom optical system described above, the following conditional expression (5) is satisfied, $$0.01 < MWF1/MWF2 < 1.00 \quad (5)$$

where MWF1: an amount of movement of the first focusing lens group upon focusing from the infinity object to the short distance object in a wide angle end state, and MWF2: an amount of movement of the second focusing lens group upon focusing from the infinity object to the short distance object in the wide angle end state.

Note that movement toward an image surface is chosen to be positive.

The conditional expression (5) described above defines the ratio between the amount of movement of the first focusing lens group GF1 upon focusing from the infinity object to the short distance object in the wide angle end state, and the amount of movement of the second focusing lens group GF2 upon focusing from the infinity object to the short distance object in the wide angle end state. By satisfying the conditional expression (5), the variation in various aberrations including the spherical aberration upon focusing from the infinity object to the short distance object can be favorably suppressed. To further secure the advantageous effects of this embodiment, it is preferable to set the upper limit value of the conditional expression (5) to 0.95, 0.90, 0.88, 0.85, 0.83, 0.78, 0.75, 0.73, or 0.70, for example. It is preferable to set the lower limit value of the conditional expression (5) to 0.05, 0.10, 0.15, 0.20, 0.23, 0.25, 0.28, or 0.30, for example.

Preferably, in the zoom optical system described above, the second focusing lens group GF2 consists of one positive lens and one negative lens. Accordingly, the variation in chromatic aberrations upon focusing from the infinity object to the short distance object can be effectively corrected.

In the zoom optical system described above, the first lens group G1 comprises at least one positive lens, and the following conditional expression (6) is satisfied, $$60.00 < vp \quad (6)$$

where vp: an Abbe number of the positive lens included in the first lens group.

In the zoom optical system described above, the first lens group G1 has a configuration of including at least one positive lens, and the positive lens satisfies the conditional expression (6), thereby allowing the longitudinal chromatic aberration to be effectively suppressed. To further secure the advantageous effects of this embodiment, it is preferable to set the lower limit value of the conditional expression (6) to 63.0, 68.0, 72.0, 75.0, 78.0, or 80.0, for example.

In the zoom optical system described above, it is preferable that at least part of the lens group adjacent to the first focusing lens group GF1 on the object side be allowed to move in a direction perpendicular to the optical axis, and enable image blur correction to be achieved. Accordingly, image surface inclination and variation in decentering coma aberration upon camera shake correction can be effectively suppressed.

Preferably, in the zoom optical system described above, the following conditional expression (7) is satisfied, $$0.10 < \beta F1w < 0.80 \quad (7)$$

where βF1w: a lateral magnification of the first focusing lens group in a wide angle end state.

The conditional expression (7) defines the lateral magnification of the first focusing lens group GF1 upon focusing on the infinity object in the wide angle end state. By satisfying the conditional expression (7), the variation in the various aberrations including the spherical aberration upon focusing from the infinity object to the short distance object in the wide angle end state can be favorably suppressed. To further secure the advantageous effects of this embodiment, it is preferable to set the upper limit value of the conditional expression (7) to 0.75, 0.70, 0.68, 0.65, 0.63, 0.60, 0.58, or 0.55, for example. It is preferable to set the lower limit value of the conditional expression (7) to 0.15, 0.20, 0.25, 0.30, 0.33, 0.35, or 0.38, for example.

Preferably, in the zoom optical system described above, the following conditional expression (8) is satisfied, $$0.10 < 1/\beta F2w < 0.60 \quad (8)$$

where βF2w: a lateral magnification of the second focusing lens group in a wide angle end state.

The conditional expression (8) defines the lateral magnification of the second focusing lens group GF2 upon focusing on the infinity object in the wide angle end state. By satisfying the conditional expression (8), the variation in the various aberrations including the spherical aberration upon focusing from the infinity object to the short distance object in the wide angle end state can be favorably suppressed. To further secure the advantageous effects of this embodiment, it is preferable to set the upper limit value of the conditional expression (8) to 0.55, 0.50, 0.48, 0.45, 0.43, 0.40, 0.38, or 0.35, for example. It is preferable to set the lower limit value of the conditional expression (8) to 0.13, 0.15, 0.18, 0.20, 0.23, or 0.25, for example.

Preferably, in the zoom optical system described above, the following conditional expression (9) is satisfied, $$(\beta F1w + 1/\beta F1w)^{-2} < 0.25. \quad (9)$$

The conditional expression (9) defines the relationship of the lateral magnification of the first focusing lens group GF1 upon focusing on the infinity object in the wide angle end state. By satisfying the conditional expression (9), the various aberrations including the spherical aberration, the distortion and the coma aberration upon focusing from the infinity object to the short distance object in the wide angle end state can be suppressed while the amount of movement can be reduced. To further secure the advantageous effects of this embodiment, it is preferable to set the upper limit value of the conditional expression (9) to 0.24, 0.22, 0.21, 0.20, 0.19, or 0.18, for example.

Preferably, in the zoom optical system described above, the following conditional expression (10) is satisfied, $$(\beta F2w + 1/(\beta F2w)^{-2} < 0.15. \quad (10)$$

The conditional expression (10) defines the relationship of the lateral magnification of the second focusing lens group GF2 upon focusing on the infinity object in the wide angle end state. By satisfying the conditional expression (10), the various aberrations including the spherical aberration, the distortion and the coma aberration upon focusing from the infinity object to the short distance object in the wide angle end state can be suppressed while the amount of movement can be reduced. To further secure the advantageous effects of this embodiment, it is preferable to set the upper limit value of the conditional expression (10) to 0.14, 0.13, 0.12, 0.11, or 0.10, for example.

Preferably, in the zoom optical system described above, the following conditional expression (11) is satisfied, $$15.00° < 2\omega w < 45.00° \quad (11)$$

where 2ωw: a full angle of view [°] of the zoom optical system in a wide angle end state.

The conditional expression (11) defines the full angle of view of the zoom optical system in the wide angle end state. To further secure the advantageous effects of this embodiment, it is preferable to set the upper limit value of the conditional expression (11) to 044.00°, 42.00°, 40.00°, 38.00°, 36.00°, or 35.00°, for example. It is preferable to set the lower limit value of the conditional expression (11) to 18.00°, 20.00°, 23.00°, 25.00°, 28.00°, 30.00°, or 32.00°, for example.

Preferably, in the zoom optical system described above, the following conditional expression (12) is satisfied, $$0.05 < Bfw/fw < 0.35 \qquad (12)$$

where Bfw: a back focus in a wide-angle end state, and
fw: a focal length of the zoom optical system in the wide angle end state.

The conditional expression (12) described above defines the ratio between the back focus of the zoom optical system in the wide angle end state, and the focal length of the zoom optical system in the wide angle end state. By satisfying the conditional expression (12), the various aberrations including the coma aberration in the wide angle end state can be effectively corrected. To further secure the advantageous effects of this embodiment, it is preferable to set the upper limit value of the conditional expression (12) to 0.34, 0.32, 0.30, 0.29, or 0.28, for example. It is preferable to set the lower limit value of the conditional expression (12) to 0.06, 0.08, 0.10, 0.12, or 0.14, for example.

Figure 13:
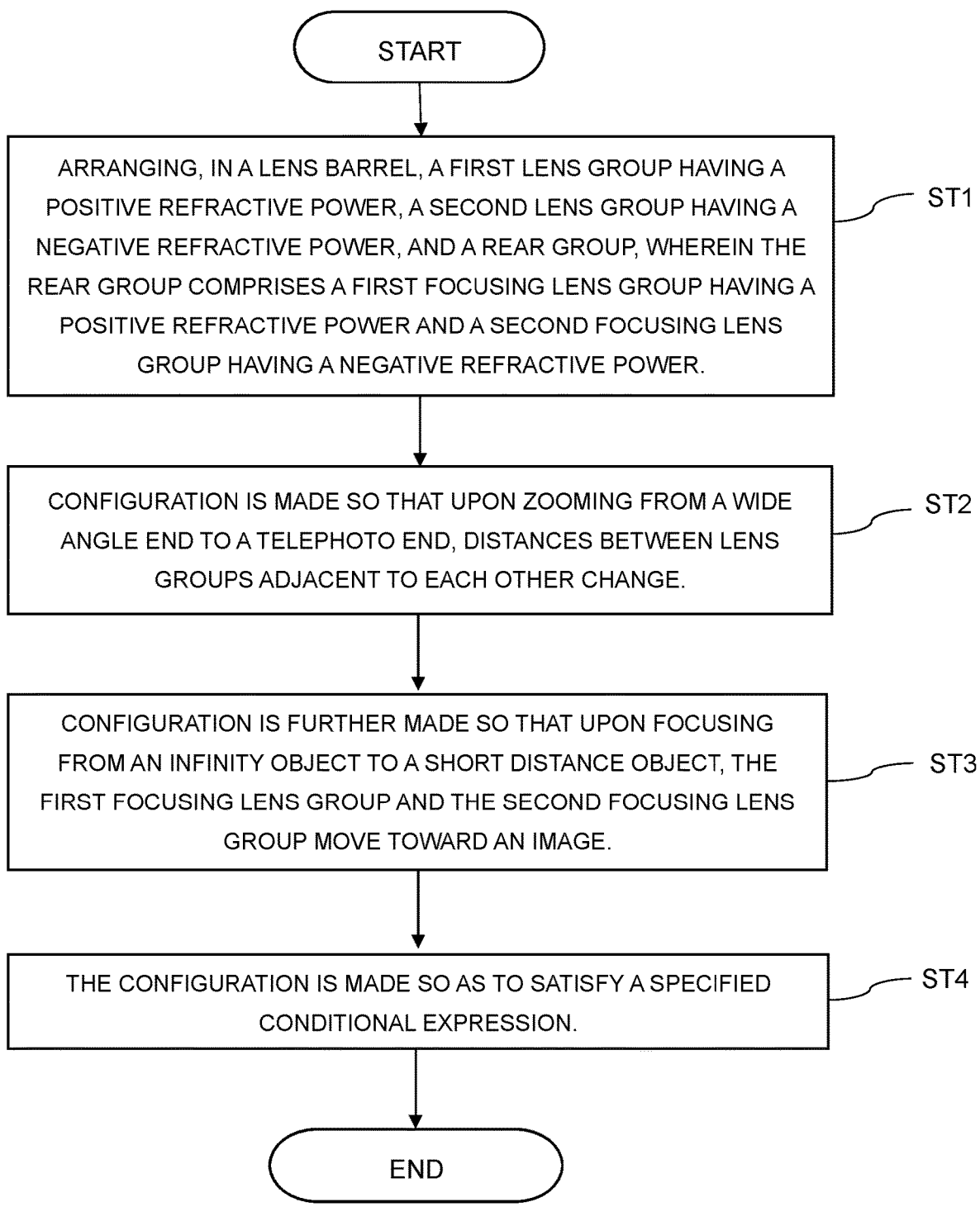
FIG. 13 is a flowchart showing a method for manufacturing the zoom optical system according to this embodiment.

Subsequently, referring to FIG. 13, a method for manufacturing the optical system is schematically described. According to the manufacturing method, first, a first lens group having a positive refractive power, a second lens group having a negative refractive power, and a rear group including a plurality of lens groups, which are in order from an object on the optical axis, are arranged (step ST1). Note that the rear group comprises a first focusing lens group having a positive refractive power, and a second focusing lens group having a negative refractive power. Next, configuration is made so that upon zooming from a wide angle end to a telephoto end, distances between lens groups adjacent to each other among the first lens group, the second lens group, and the plurality of lens groups, change (step ST2). Configuration is further made so that upon focusing from an infinity object to a short distance object, the first focusing lens group and the second focusing lens group move toward an image along movement trajectories different from each other (step ST3). The configuration is made so as to satisfy the following conditional expression (step ST4).

$$1.10 < f2/fF2 < 2.00$$

where f2: a focal length of the second lens group, and
fF2: a focal length of the second focusing lens group.

The aforementioned zoom optical system according to this embodiment, and the camera (optical apparatus) including the zoom optical system, and the zoom optical system manufactured by the aforementioned manufacturing method can reduce the lens groups for focusing in size and weight, which can achieve high-speed AF and silence during AF without increasing the size of the lens barrel. Furthermore, the variation in aberrations upon zooming from the wide angle end state to the telephoto end state, and the variation in aberrations upon focusing from the infinity object to the short distance object, can be favorably suppressed.

EXAMPLES

Hereinafter, zoom optical systems ZL according to specific examples of the aforementioned embodiment are described with reference to the drawings. FIGS. 1, 4, 7 and 10 are sectional views showing the configurations and refractive power allocations of the zoom optical systems ZL {ZL(1) to ZL(4)} according to the first to fourth examples. In each sectional view, the moving direction of each lens group on the optical axis upon zooming from the wide angle end state (W) to the telephoto end state (T) is indicated by an arrow. Furthermore, the moving direction of the focusing lens group upon focusing from infinity to a short distance object is indicated by an arrow accompanied by characters "FOCUSING".

In these diagrams (FIGS. 1, 4, 7 and 10), each lens group is represented by a combination of a symbol G and a numeral, and each lens is represented by a combination of a symbol L and a numeral. In this case, to prevent complication due to increase in the types and numbers of symbols and numerals, the lens groups and the like are represented using the combinations of symbols and numerals independently on an example-by-example basis. Accordingly, even when the same combination of a symbol and a numeral is used among the examples, such usage does not necessarily mean the same configuration.

FIGS. 2A, 2B and 2C, FIGS. 3A, 3B and 3C, FIGS. 5A, 5B and 5C, FIGS. 6A, 6B and 6C, FIGS. 8A, 8B and 8C, FIGS. 9A, 9B and 9C, FIGS. 11A, 11B and 11C, and FIGS. 12A, 12B and 12C show various aberrations of the zoom optical systems ZL(1) to ZL(4) according to the first to fourth examples. In these diagrams, FNO indicates the f-number, NA indicates the numerical aperture, and Y indicates the image height. The spherical aberration graph indicates the value of the f-number or the numerical aperture that corresponds to the maximum aperture. The astigmatism graph and the distortion graph each indicate the maximum value of the image height. The coma aberration graph indicates the value of the corresponding image height. The symbol d indicates d-line (λ=587.6 nm). The symbol g indicates g-line (λ=435.8 nm). In the astigmatism graph, a solid line indicates a sagittal image surface, and a broken line indicates a meridional image surface. The distortion graph shows the distortion with reference to d-line. The graph of chromatic aberration of magnification shows the chromatic aberration of magnification with reference to g-line.

Hereinafter, Tables 1 to 4 are shown. Among these tables, Table 1 is a table showing each data item in the first example, Table 2 is that in the second example, Table 3 is that in the third example, and Table 4 is that in the fourth example. In each example, for calculation of aberration characteristics, d-line (wavelength λ=587.6 nm), and g-line (wavelength λ=435.8 nm) are selected.

In the table of [General Data], F.NO indicates the f-number, and 2ω indicates the angle of view (the unit is ° (degrees), and co indicates the half angle of view). TL indicates, as the air equivalent length, a distance obtained by adding BF to the distance from the lens foremost surface to the lens last surface on the optical axis upon focusing on infinity. BF indicates the air equivalent distance (back focus) from the lens last surface to the image surface I on the optical axis upon focusing on infinity. Note that these values are indicated for corresponding zoom states at the wide-angle end (W), the intermediate focal length (M), and the telephoto end (T).

In the table of [Lens Data], Surface Number (the number of the field indicated by characters of Surface) indicates the order of the optical surface from the object side along the direction in which the ray travels, R indicates the radius of curvature (the surface whose center of curvature resides on the image side is regarded to have a positive value) of each optical surface, D indicates the distance on the optical axis from each optical surface to the next optical surface (or the image surface), nd is the refractive index of the material of the optical member for d-line, and vd indicates the Abbe number of the material of the optical member with reference to d-line. The radius of curvature "∞" indicates a plane or an opening. (Stop S) indicates an aperture stop. The description of the air refractive index nd=1.00000 is omitted. In a case where the lens surface is an aspherical surface, the surface number is assigned * symbol, and the field of the radius of curvature R indicates the paraxial radius of curvature.

In the table of [Aspherical Data], the shape of the aspherical surface indicated in [Lens Data] is indicated by the following expression (A). X(y) indicates the distance (sag amount) from the tangent plane at the vertex of the aspherical surface to the position on the aspherical surface at the height y in the optical axis direction. R indicates the radius of curvature (paraxial radius of curvature) of the reference spherical surface. κ indicates the conic constant. Ai indicates the i-th aspherical coefficient. "E-n" indicates "×10$^{-N}$". For example, 1.234 E−05=1.234×10$^{-5}$. Note that the second-order aspherical coefficient A2 is zero, and the description thereof is omitted.

$$X(y)=(y^2/R)/\{1+(1-\kappa \times y^2/R^2)^{1/2}\}+A4 \times y^4+A6 \times y^6+A8 \times y^8+A10 \times y^{10}+A12 \times y^{12} \quad (A)$$

The table of [Lens Group Data] shows the first surface (the surface closest to the object) of each lens group, and the focal length of the corresponding lens group.

The table of [Variable Distance Data] shows the surface distance at each surface number where the surface distance is "Variable" in the table showing [Lens Data]. Here, for cases of focusing on infinity and a short distance, the surface distances in each of zooming states at the wide angle end (W), the intermediate focal length (M) and the telephoto end (T) are shown in a manner classified into a case of focusing at a normal distance and a case of focusing at a very short distance. Note that the first row indicates the entire focal length f (the case of focusing at the normal distance) or the lateral magnification β (the case of focusing at the very short distance) in each zooming state.

The table [Magnification] shows the lateral magnification βF1 of the first focusing lens group, and the lateral magnification βF2 of the second focusing lens group, in each of zooming states at the wide angle end (W), the intermediate focal length (M) and the telephoto end (T), in a manner classified into the case of focusing at the normal distance and the case of focusing at the very short distance.

The table [Other Data] shows the focal length fw of the zoom optical system ZL in the wide angle end state, the focal length ft of the zoom optical system ZL in the telephoto end state, the back focus Bfw in the wide angle end state, the focal length fF1 of the first focusing lens group GF1, the focal length fF2 of the second focusing lens group GF2, the focal length fr of the final lens group disposed closest to the image, and the amount of movement MWF1 of the first focusing lens group and the amount of movement MWF2 of the second focusing lens group upon zooming from the infinity object to the short distance object (shortest distance object) in the wide angle end state.

Tables of [Conditional Expression Corresponding Value] are provided at the end of the description of every example (first to fourth examples). This table collectively indicates values corresponding to the conditional expressions with respect to all the examples (first to fourth examples).

Hereinafter, at all the data values, the listed focal length f, radius of curvature R, surface distance D, other lengths and the like are generally represented in "mm" if not otherwise specified. However, even after subjected to proportional scaling in or out, the optical system can achieve equivalent optical performances. Accordingly, the representation is not limited thereto.

The descriptions of the tables so far are common to all the examples. Redundant descriptions are hereinafter omitted.

First Example

A first example is described with reference to FIGS. 1 to 3A, 3B and 3C and Table 1. FIG. 1 shows the lens configuration of a zoom optical system according to the first example. The zoom optical system ZL(1) according to the first example consists of, in order from the object: a first lens group G1 having a positive refractive power; a second lens group G2 having a negative refractive power; a third lens group G3 having a positive refractive power; an aperture stop S; a fourth lens group G4 having a negative refractive power; a fifth lens group G5 having a positive refractive power; a sixth lens group G6 having a negative refractive power; a seventh lens group G7 having a positive refractive power; and an eighth lens group G8 having a negative refractive power. Note that an imaging element 4 that includes an image surface I is disposed on the image side of the eighth lens group G8.

Upon zooming from the wide-angle end state (W) to the telephoto end state (T), the first to third lens groups G1 to G3, the fifth and sixth lens groups G5 and G6, and the eighth lens group G8 move in the axial direction as indicated by arrows in FIG. 1, and the distances between lens groups adjacent to each other change. Note that the fourth and seventh lens groups G4 and G7 are fixed and stationary upon zooming. Note that the lens group that consists of the third to eighth lens groups G3 to G8 corresponds to the rear group GR. A sign (+) or (−) assigned to each lens group symbol indicates the refractive power of the corresponding lens group. This indication similarly applies to all the following examples.

The first lens group G1 consists of, in order from the object: a cemented lens including a negative meniscus lens L11 having a convex surface facing the object, and a biconvex positive lens L12; and a positive meniscus lens L13 having a convex surface facing the object.

The second lens group G2 consists of, in order from the object: a biconcave negative lens L21; and a cemented lens including a negative meniscus lens L22 having a convex surface facing the object, and a positive meniscus lens L23 having a convex surface facing the object.

The third lens group G3 consists of, in order from the object: a biconvex positive lens L31; and a positive meniscus lens L32 having a convex surface facing the object.

The fourth lens group G4 consists of, in order from the object: an aperture stop S; a biconcave negative lens L41; a cemented lens including a negative meniscus lens L42 having a convex surface facing the object, and a biconvex positive lens L43; and a positive meniscus lens L44 having a convex surface facing the object. The aperture stop S is provided on the image side of the fourth lens group G4, and moves with the fourth lens group G4 upon zooming. Preferably, configuration is made so as to move the cemented lens including the negative meniscus lens L42 and the positive lens L43, and the positive meniscus lens L44 perpendicularly to the optical axis, and thus constitute a vibration proof lens that achieves camera shake correction.

The fifth lens group G5 consists of a positive meniscus lens L51 having a convex surface facing the object. The fifth lens group G5 constitutes a first focusing lens group GF1 that is moved upon focusing.

The sixth lens group G6 consists of a cemented lens including a biconvex positive lens L61 and a biconcave negative lens L62. The sixth lens group G6 constitutes a second focusing lens group GF2 that is moved upon focusing.

The seventh lens group G7 consists of, in order from the object: a cemented lens including a negative meniscus lens L71 having a convex surface facing the object, and a biconvex positive lens L72; and a negative meniscus lens L73 having a concave surface facing the object.

The eighth lens group G8 consists of a negative meniscus lens L81 having a concave surface facing the object. A parallel plate PP is disposed before the image surface I.

In this example, as described above, the fifth lens group G5 constitutes the first focusing lens group GF1, and the sixth lens group G6 constitutes the second focusing lens group GF2. As the state of focusing on a long distance object (infinity object) is changed to the state of focusing on a short distance object, both the focusing lens groups GF1 and GF2 move toward the image as indicated by the arrows. Note that the movement trajectories are different from each other.

The following Table 1 lists values of data on the zoom optical system according to the first example.

TABLE 1

[General Data]

|  | W | M | T |
|---|---|---|---|
| F.NO | 4.0951 | 4.09535 | 4.09833 |
| 2ω | 34.15798 | 19.5708 | 12.31288 |
| Air equivalent TL | 166.38 | 187.45 | 194.45 |
| Air equivalent BF | 11.1546 | 18.7416 | 26.5245 |

[Lens Data]

| Surface | R | D | nd | νd |
|---|---|---|---|---|
| 1 | 500.00 | 1.99 | 1.83400 | 37.18 |
| 2 | 105.771 | 8.57 | 1.49700 | 81.61 |
| 3 | −149.176 | 0.10 | 1.00000 | |
| 4 | 69.0714 | 5.76 | 1.49700 | 81.61 |
| 5 | 195.431 | Variable | 1.00000 | |
| 6 | −95.4875 | 1.39 | 1.77250 | 49.61 |
| 7 | 60.8786 | 1.60 | 1.00000 | |
| 8 | 134.479 | 1.29 | 1.60300 | 65.4 |
| 9 | 40.9439 | 2.64 | 2.00069 | 25.46 |
| 10 | 100.515 | Variable | 1.00000 | |
| 11 | 60.695 | 3.41 | 1.59319 | 67.87 |
| 12 | −452.202 | 0.10 | 1.00000 | |
| 13 | 51.5441 | 2.53 | 1.69680 | 55.48 |
| 14 | 171.456 | Variable | 1.00000 | |
| 15 | ∞ | 1.40 | 1.00000 | Aperture Stop |
| 16 | −348.825 | 1.29 | 1.72825 | 28.38 |
| 17 | 41.809 | 2.16 | 1.00000 | |
| 18 | 74.9298 | 1.19 | 1.85000 | 27.03 |
| 19 | 38.2117 | 3.23 | 1.51680 | 63.8 |
| 20 | −543.588 | 0.28 | 1.00000 | |
| 21 | 71.1546 | 2.16 | 1.90265 | 35.72 |
| 22 | 311.075 | Variable | 1.00000 | |
| 23 | 70.6244 | 1.79 | 1.75500 | 52.36 |
| 24 | 2710.11 | Variable | 1.00000 | |
| 25 | 121.18 | 1.99 | 1.84666 | 23.8 |
| 26 | −85.4601 | 0.79 | 1.77250 | 49.61 |
| 27 | 27.6526 | Variable | 1.00000 | |
| 28 | 34.0186 | 0.99 | 1.90265 | 35.72 |
| 29 | 25.5061 | 8.47 | 1.51680 | 63.8 |
| 30 | −36.1299 | 2.00 | 1.00000 | |
| 31 | −54.7648 | 1.70 | 1.72916 | 54.62 |
| 32 | −1228.74 | Variable | 1.00000 | |
| 33 | −37.2066 | 1.49 | 1.80400 | 46.58 |
| 34 | −150.0 | Variable | 1.00000 | |
| 35 | ∞ | 2.00 | 1.51680 | 63.88 |
| 36 | ∞ | 0.10 | 1.00000 | |
| Image Surface (I) | ∞ | | | |

[Lens Group Data]

| Group | First surface | Focal length |
|---|---|---|
| G1 | 1 | 151.18674 |
| G2 | 6 | −60.4899 |
| G3 | 11 | 48.89599 |
| G4 | 16 | −193.87542 |
| G5 | 23 | 96.01709 |

TABLE 1-continued

| | | |
|---|---|---|
| G6 | 25 | −50.55695 |
| G7 | 28 | 73.01107 |
| G8 | 33 | −61.90763 |

[Variable Distance Data]

| | W | M | T | W Very short distance | M Very short distance | T Very short distance |
|---|---|---|---|---|---|---|
| f | 72.00 | 123.00 | 193.99 | −0.08301 | −0.138 | −0.21187 |
| d5 | 3.55932 | 39.103 | 61.1932 | 3.55932 | 39.103 | 61.1932 |
| d10 | 36.3561 | 19.9769 | 1.08809 | 36.3561 | 19.9769 | 1.08809 |
| d14 | 1.86104 | 3.7562 | 7.53637 | 1.86104 | 3.7562 | 7.53637 |
| d22 | 2.50539 | 2.4 | 8.87949 | 4.68933 | 3.83126 | 12.50417 |
| d24 | 11.711 | 9.41711 | 1.95377 | 13.89494 | 15.14216 | 14.64016 |
| d21 | 15.058 | 17.468 | 18.4803 | 10.69012 | 10.31168 | 2.16923 |
| d32 | 23.87795 | 16.29295 | 8.50055 | 23.87795 | 16.29295 | 8.50055 |
| d34 | 9.73607 | 17.32302 | 25.1059 | 9.73607 | 17.32302 | 25.1059 |

[Magnification]

| | W | M | T | W Very short distance | M Very short distance | T Very short distance |
|---|---|---|---|---|---|---|
| βF1 | 0.47058 | 0.50753 | 0.6043 | 0.45172 | 0.45556 | 0.49556 |
| βF2 | 3.46577 | 3.1914 | 2.86125 | 3.37937 | 3.04985 | 2.53862 |

[Other Data]

| | |
|---|---|
| fw | 72.003 |
| ft | 193.994 |
| Bfw | 11.155 |
| fF1 | 96.017 |
| fF2 | −50.557 |
| fr | −61.91 |
| MWF1 | 2.184 |
| MWF2 | 4.368 |

Figure 2A:
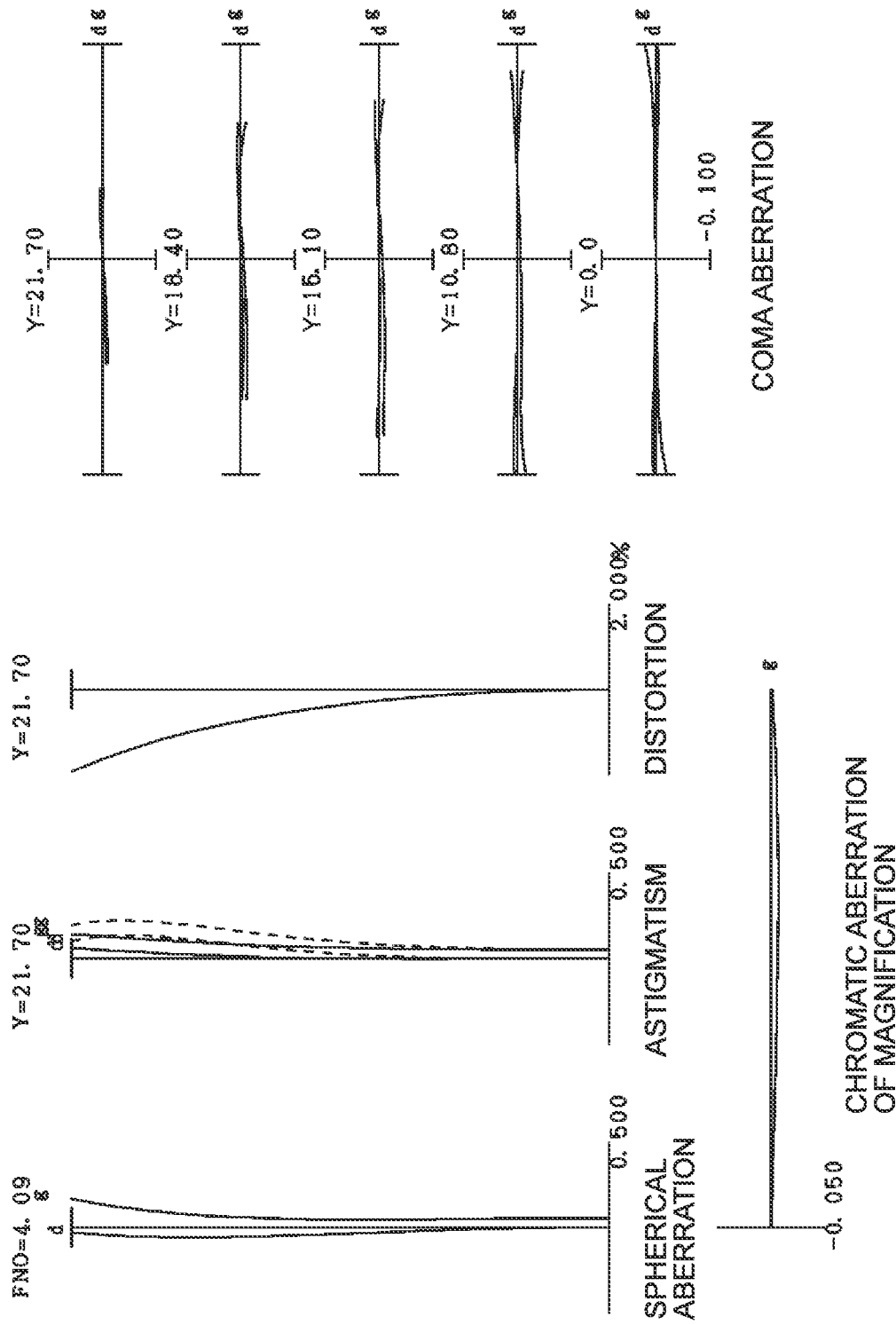
Figure 2C:
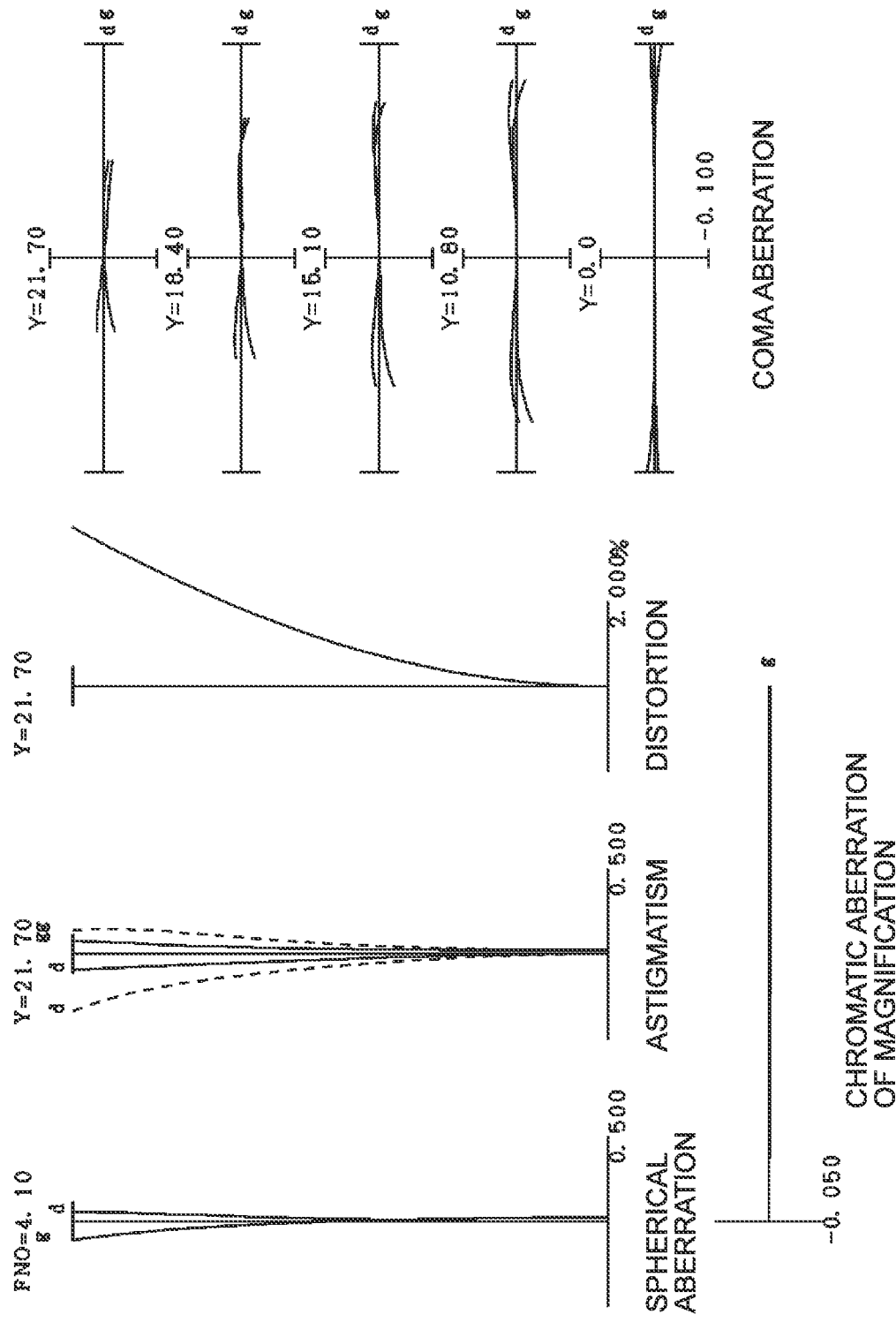
Figure 3B:
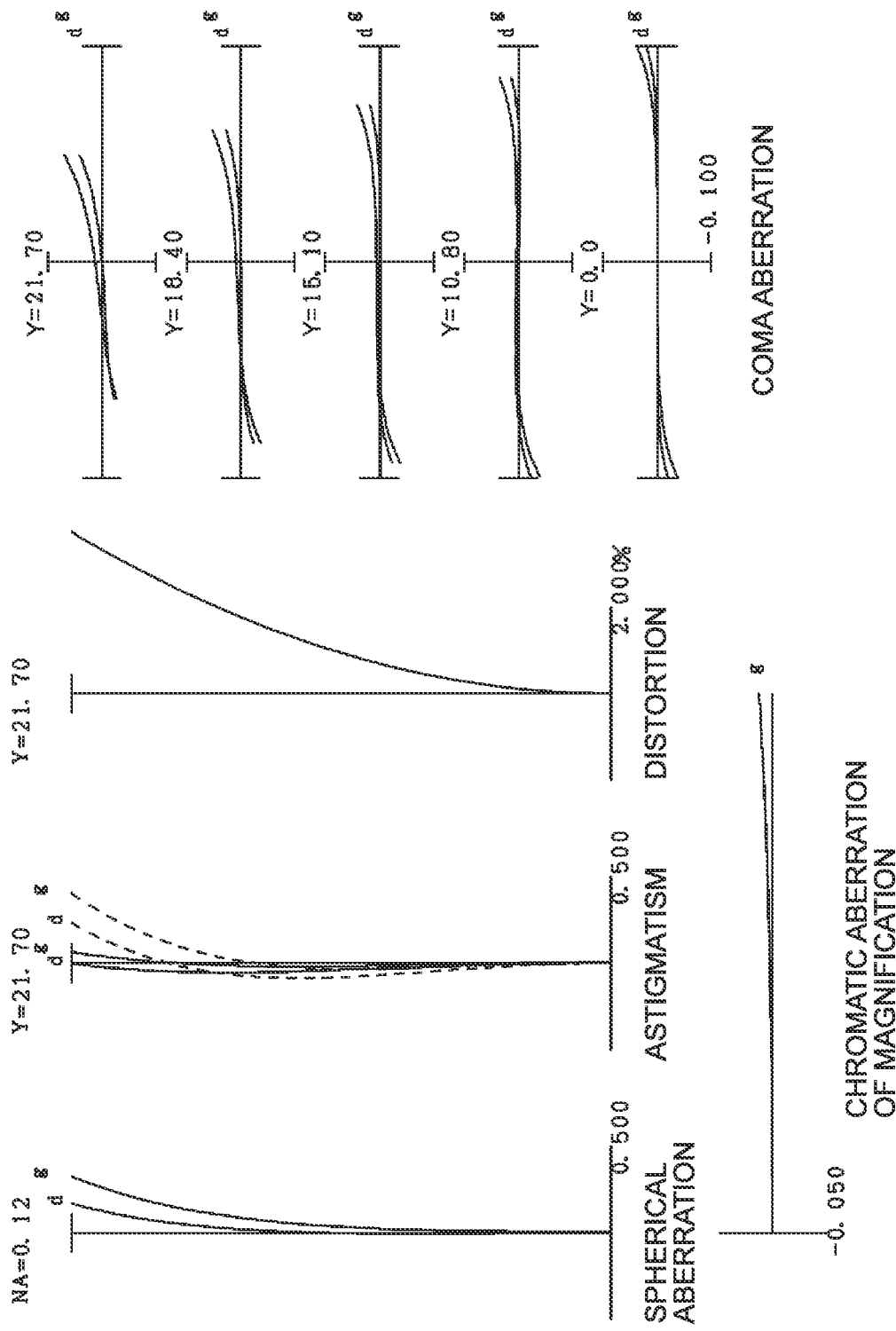

FIGS. 2A, 2B and 2C are graphs respectively showing various aberrations of the zoom optical system according to the first example upon focusing on infinity in a wide-angle end state, an intermediate focal length state, and a telephoto end state. FIGS. 3A, 3B and 3C are graphs respectively showing various aberrations of the zoom optical system according to the first example upon focusing on a very short distance object in the wide-angle end state, the intermediate focal length state, and the telephoto end state.

In each of the graphs of FIGS. 2A, 2B and 2C, FNO indicates the f-number, and Y indicates the image height. The spherical aberration graph indicates the value of the f-number corresponding to the maximum diameter. The astigmatism graph and the distortion graph each indicate the maximum value of the image height. The coma aberration graph indicates the value of the corresponding image height. In each of the graphs of FIGS. 3A, 3B and 3C, NA indicates the numerical aperture, and Y indicates the image height. The spherical aberration graph indicates the value of the numerical aperture corresponding to the maximum diameter. The astigmatism graph and the distortion graph each indicate the maximum value of the image height. The coma aberration graph indicates the value of the corresponding image height. In each aberration graph, the symbol d indicates d-line (wavelength λ=587.6 nm). The symbol g indicates g-line (wavelength λ=435.8 nm). In the astigmatism graph, a solid line indicates a sagittal image surface, and a broken line indicates a meridional image surface. Note that also in the following aberration graphs in each example, symbols similar to those in this example are used, and redundant description is omitted.

The graphs showing various aberrations exhibit that the zoom optical system according to the first example favorably corrects various aberrations and has an excellent imaging performance from the wide angle end state to the telephoto end state, and further has an excellent imaging performance also upon focusing on the very short distance object.

Second Example

Figure 4:
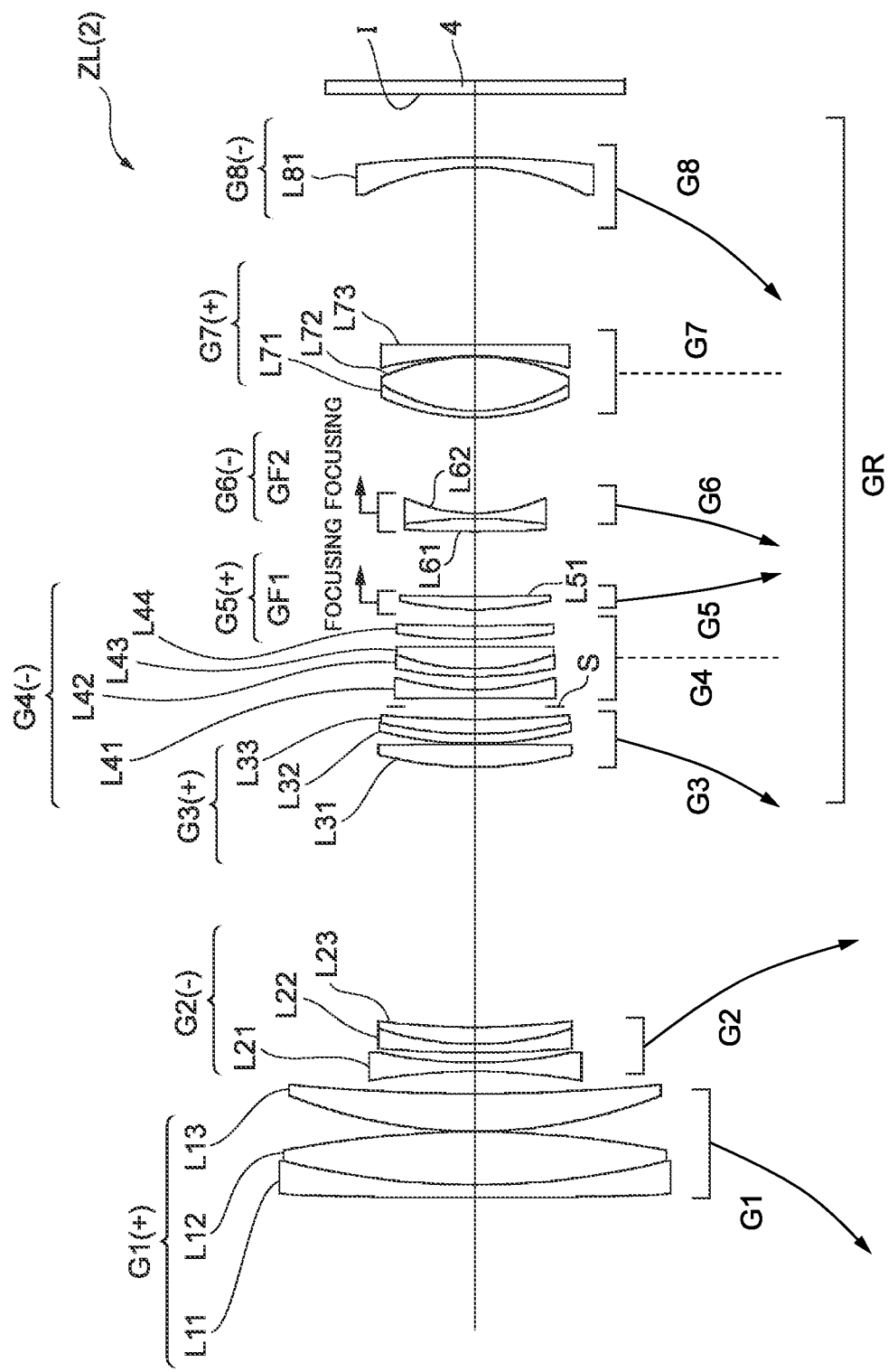
FIG. 4 shows a lens configuration of a zoom optical system according to a second example.

A second example is described with reference to FIGS. 4 to FIGS. 6A, 6B and 6C and Table 2. FIG. 4 shows the lens configuration of a zoom optical system according to the second example. The zoom optical system ZL(2) according to the second example consists of, in order from the object: a first lens group G1 having a positive refractive power; a second lens group G2 having a negative refractive power; a third lens group G3 having a positive refractive power; an aperture stop S; a fourth lens group G4 having a negative refractive power; a fifth lens group G5 having a positive refractive power; a sixth lens group G6 having a negative refractive power; a seventh lens group G7 having a positive refractive power; and an eighth lens group G8 having a negative refractive power. Note that an imaging element 4 that includes an image surface I is disposed on the image side of the eighth lens group G8.

Upon zooming from the wide-angle end state (W) to the telephoto end state (T), the first to third lens groups G1 to G3, the fifth and sixth lens groups G5 and G6, and the eighth lens group G8 move in the axial direction as indicated by arrows in FIG. 4, and the distances between lens groups adjacent to each other change. Note that the fourth and seventh lens groups G4 and G7 are fixed and stationary upon zooming. Note that the lens group that consists of the third to eighth lens groups G3 to G8 corresponds to the rear group GR.

The first lens group G1 consists of, in order from the object: a cemented lens including a negative meniscus lens L11 having a convex surface facing the object, and a biconvex positive lens L12; and a positive meniscus lens L13 having a convex surface facing the object.

The second lens group G2 consists of, in order from the object: a biconcave negative lens L21; and a cemented lens including a negative meniscus lens L22 having a convex surface facing the object, and a positive meniscus lens L23 having a convex surface facing the object.

The third lens group G3 consists of, in order from the object: a biconvex positive lens L31; and a cemented lens including a positive meniscus lens L32 having a convex surface facing the object, and a positive meniscus lens L33 having a convex surface facing the object.

The fourth lens group G4 consists of, in order from the object: an aperture stop S; a biconcave negative lens L41; a cemented lens including a negative meniscus lens L42 having a convex surface facing the object, and a biconvex positive lens L43; and a positive meniscus lens L44 having a convex surface facing the object. The aperture stop S is provided on the image side of the fourth lens group G4, and moves with the fourth lens group G4 upon zooming. Preferably, configuration is made so as to move the cemented lens including the negative meniscus lens L42 and the positive lens L43, and the positive meniscus lens L44 perpendicularly to the optical axis, and thus constitute a vibration proof lens that achieves camera shake correction.

The fifth lens group G5 consists of a positive meniscus lens L51 having a convex surface facing the object. The fifth lens group G5 constitutes a first focusing lens group GF1 that is moved upon focusing.

The sixth lens group G6 consists of a cemented lens including a biconvex positive lens L61 and a biconcave negative lens L62. The sixth lens group G6 constitutes a second focusing lens group GF2 that is moved upon focusing.

The seventh lens group G7 consists of, in order from the object: a cemented lens including a negative meniscus lens L71 having a convex surface facing the object, and a biconvex positive lens L72; and a biconcave negative lens L73.

The eighth lens group G8 consists of a negative meniscus lens L81 having a concave surface facing the object. A parallel plate PP is disposed before the image surface I.

In this example, as described above, the fifth lens group G5 constitutes the first focusing lens group GF1, and the sixth lens group G6 constitutes the second focusing lens group GF2. As the state of focusing on a long distance object (infinity object) is changed to the state of focusing on a short distance object, both the focusing lens groups GF1 and GF2 move toward the image as indicated by the arrows. Note that the movement trajectories are different from each other.

The following Table 2 lists values of data on the zoom optical system according to the second example.

TABLE 2

[General Data]

|  | W | M | T |
|---|---|---|---|
| F.NO | 4.12046 | 4.11684 | 4.11125 |
| 2ω | 34.23938 | 19.50486 | 12.29088 |
| Air equivalent TL | 169.454 | 187.456 | 197.586 |
| Air equivalent BF | 11.154 | 18.408 | 26.664 |

[Lens Data]

| surface | R | D | nd | vd |
|---|---|---|---|---|
| 1 | 731.131 | 1.99 | 1.83400 | 37.18 |
| 2 | 117.25 | 8.05 | 1.49700 | 81.61 |
| 3 | −154.091 | 0.10 | 1.00000 |  |
| 4 | 77.0078 | 5.73 | 1.49700 | 81.61 |
| 5 | 281.511 | Variable | 1.00000 |  |
| 6 | −94.2427 | 1.39 | 1.75500 | 52.36 |
| 7 | 72.1547 | 1.49 | 1.00000 |  |
| 8 | 169.537 | 1.29 | 1.61800 | 63.32 |
| 9 | 46.0722 | 2.56 | 2.00069 | 25.46 |
| 10 | 115.901 | Variable | 1.00000 |  |
| 11 | 59.2825 | 3.43 | 1.59319 | 67.87 |
| 12 | −916.548 | 0.10 | 1.00000 |  |
| 13 | 55.8635 | 1.49 | 1.83481 | 42.75 |
| 14 | 61.9704 | 2.25 | 1.59319 | 67.87 |
| 15 | 174.424 | Variable | 1.00000 |  |
| 16 | ∞ | 1.33 | 1.00000 | Aperture Stop |
| 17 | −585.399 | 1.29 | 1.72825 | 28.38 |
| 18 | 41.1729 | 1.98 | 1.00000 |  |
| 19 | 60.435 | 1.19 | 1.85000 | 27.03 |
| 20 | 34.9355 | 3.36 | 1.51680 | 63.88 |
| 21 | −732.955 | 1.11 | 1.00000 |  |
| 22 | 76.1381 | 2.07 | 1.90265 | 35.72 |
| 23 | 267.9819 | Variable | 1.00000 |  |
| 24 | 52.4504 | 1.98 | 1.75500 | 52.36 |

TABLE 2-continued

| | | | | |
|---|---|---|---|---|
| 25 | 449.41 | Variable | 1.00000 | |
| 26 | 164.034 | 1.98 | 1.84666 | 23.8 |
| 27 | −73.3989 | 0.79 | 1.71999 | 50.24 |
| 28 | 25.4685 | Variable | 1.00000 | |
| 29 | 35.5194 | 0.99 | 1.90265 | 35.72 |
| 30 | 27.1214 | 8.22 | 1.51680 | 63.88 |
| 31 | −34.5587 | 0.10 | 1.00000 | |
| 32 | −58.2316 | 1.70 | 1.75500 | 52.36 |
| 33 | 4997.29 | Variable | 1.00000 | |
| 34 | −36.5066 | 1.50 | 1.77250 | 49.61 |
| 35 | −150.000 | Variable | 1.00000 | |
| 36 | ∞ | 2.00 | 1.51680 | 63.88 |
| 37 | ∞ | 0.10 | 1.00000 | |
| Image Surface (I) | ∞ | | | |

[Lens Group Data]

| Group | First surface | Focal length |
|---|---|---|
| f1 | 1 | 158.70211 |
| f2 | 6 | −65.8671 |
| f3 | 11 | 54.45619 |
| f4 | 17 | −233.30838 |
| f5 | 24 | 78.48149 |
| f6 | 26 | −47.29012 |
| f7 | 29 | 76.27788 |
| f8 | 34 | −62.81955 |

[Variable Distance Data]

| | W | M | T | W Very short distance | M Very short distance | T Very short distance |
|---|---|---|---|---|---|---|
| Focal length | 72.00356 | 122.99682 | 193.99234 | −0.08271 | −0.13753 | −0.20924 |
| d5 | 3.37147 | 39.0174 | 63.0344 | 3.37147 | 39.0174 | 63.0344 |
| d10 | 39.6223 | 19.3426 | 1.091 | 39.6223 | 19.3426 | 1.091 |
| d15 | 1.85246 | 4.49489 | 8.84929 | 1.85246 | 4.49489 | 8.84929 |
| d23 | 2.49998 | 3.09048 | 8.36222 | 6.21678 | 4.36326 | 10.59723 |
| d25 | 9.83103 | 8.03148 | 1.95682 | 11.68943 | 13.1226 | 13.13184 |
| d28 | 14.6269 | 15.8161 | 16.6366 | 9.0517 | 9.4522 | 3.22657 |
| d33 | 27.02815 | 19.78715 | 11.52424 | 27.02815 | 19.78715 | 11.52424 |
| d35 | 9.73551 | 16.98995 | 25.24534 | 9.73551 | 16.98995 | 25.24534 |

[Magnification]

| | W | M | T | W Very short distance | M Very short distance | T Very short distance |
|---|---|---|---|---|---|---|
| βF1 | 0.40348 | 0.44021 | 0.53916 | 0.38583 | 0.38343 | 0.41932 |
| βF2 | 3.49235 | 3.23369 | 2.89849 | 3.37445 | 3.09912 | 2.61492 |

[Other Data]

| | |
|---|---|
| fw | 72.004 |
| ft | 193.992 |
| Bfw | 11.155 |
| fF1 | 78.48149 |
| fF2 | −47.29012 |
| fr | −62.82 |
| MWF1 | 3.717 |
| MWF2 | 5.575 |

Figure 5B:
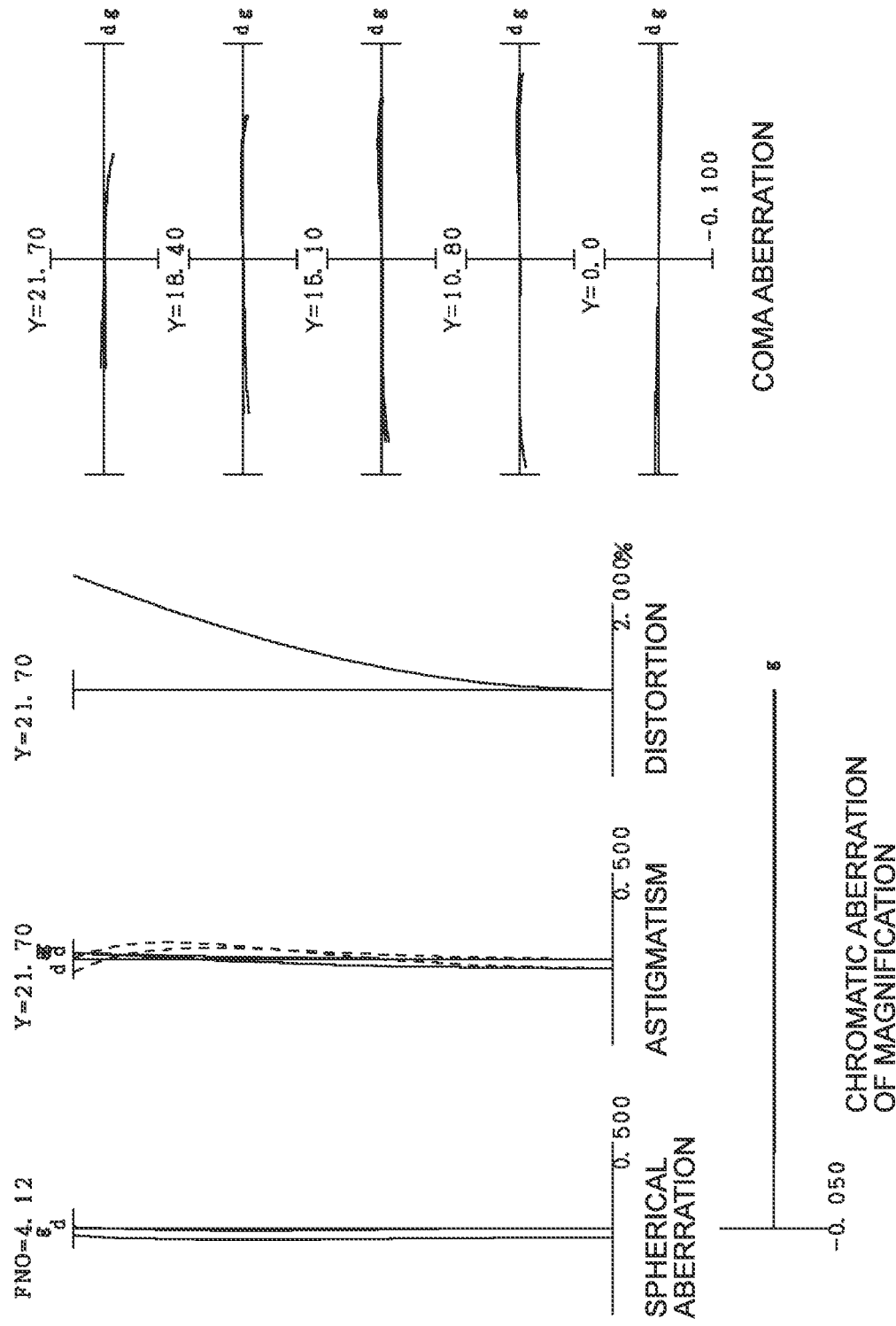
Figure 6A:
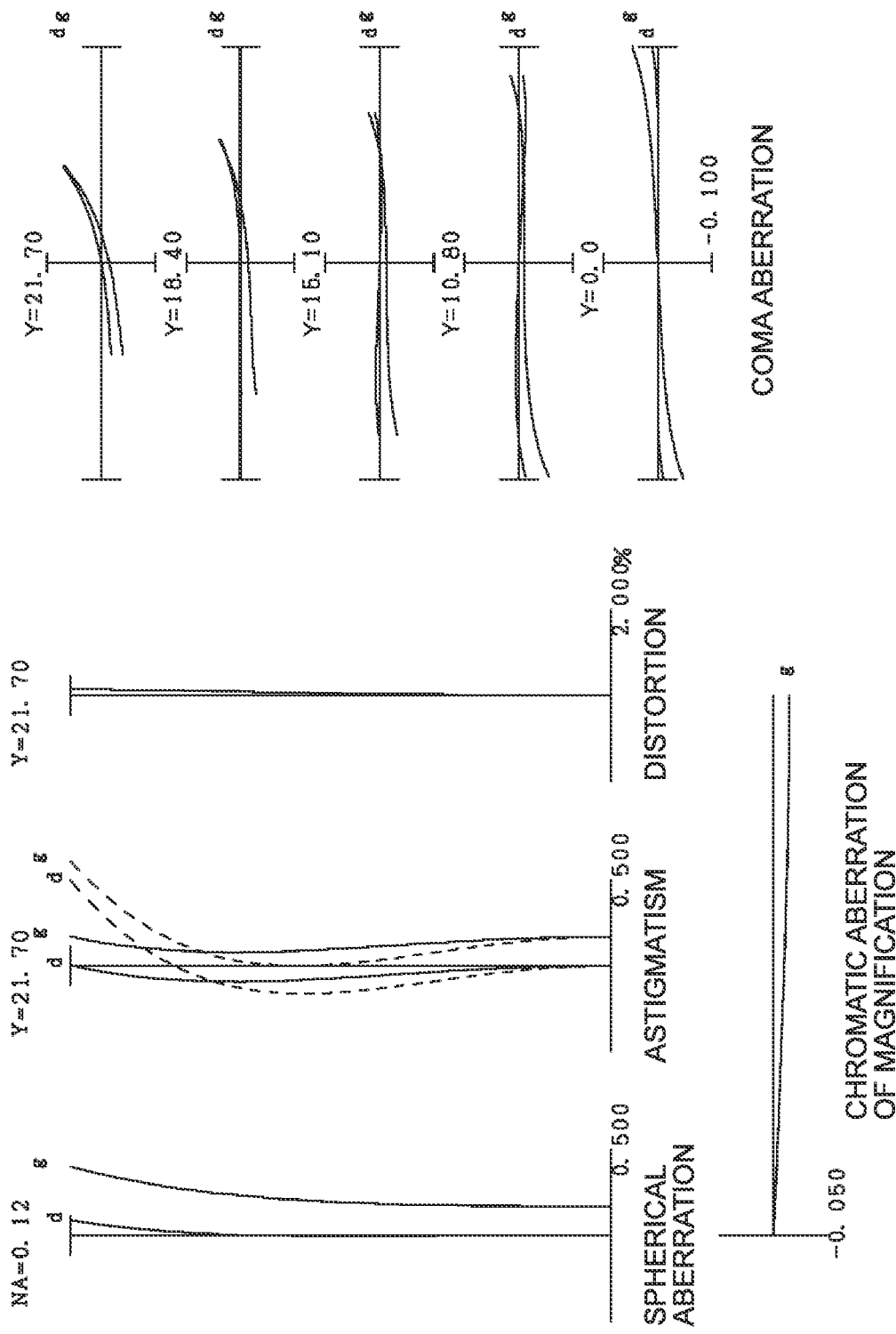
Figure 6B:
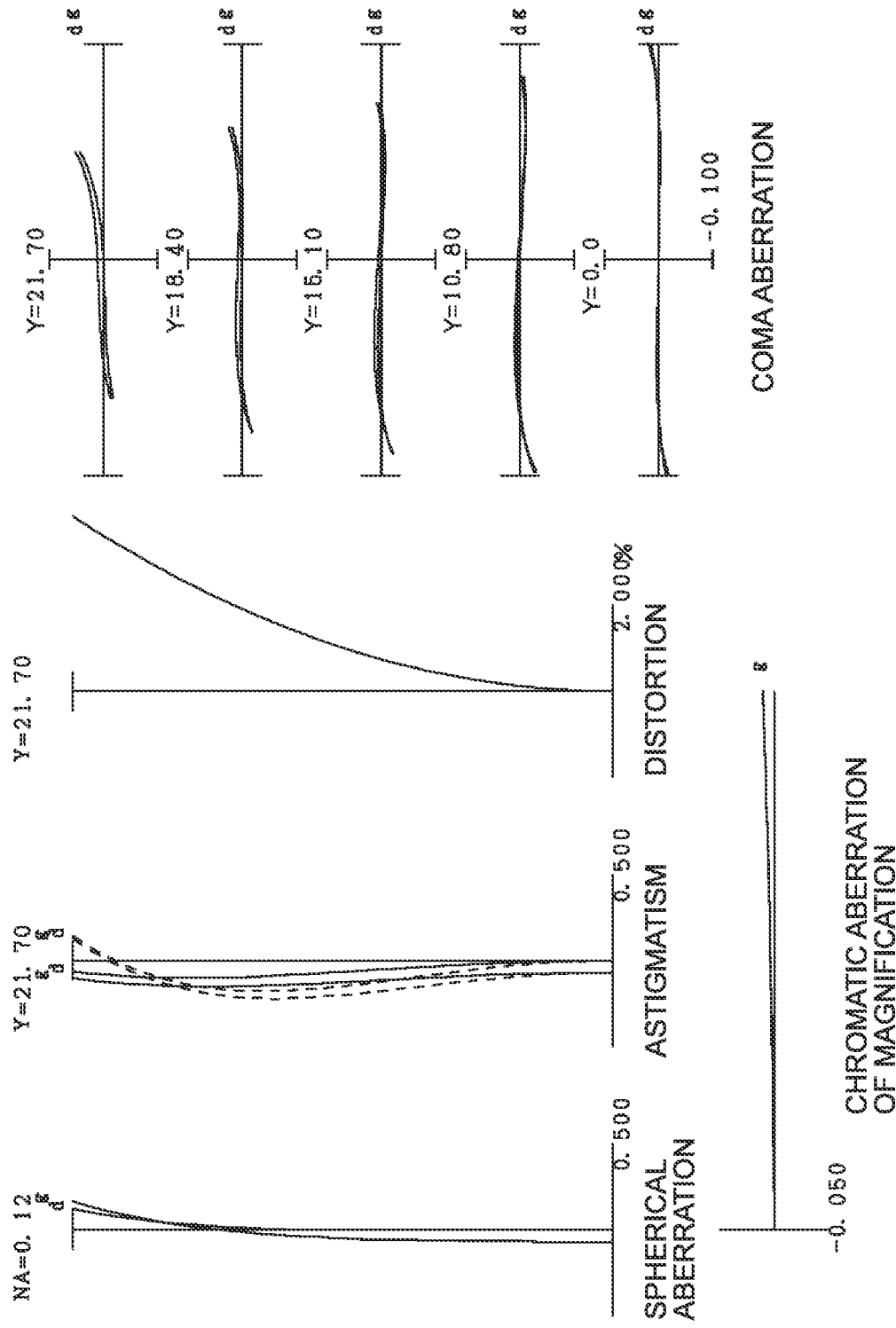

FIGS. 5A, 5B and 5C are graphs respectively showing various aberrations of the zoom optical system according to the second example upon focusing on infinity in a wide-angle end state, an intermediate focal length state, and a telephoto end state. FIGS. 6A, 6B and 6C are graphs respectively showing various aberrations of the zoom optical system according to the second example upon focusing on a very short distance object in the wide-angle end state, the intermediate focal length state, and the telephoto end state.

The graphs showing various aberrations exhibit that the zoom optical system according to the second example favorably corrects various aberrations and has an excellent imaging performance from the wide angle end state to the telephoto end state, and further has an excellent imaging performance also upon focusing on the very short distance object.

Third Example

Figure 7:
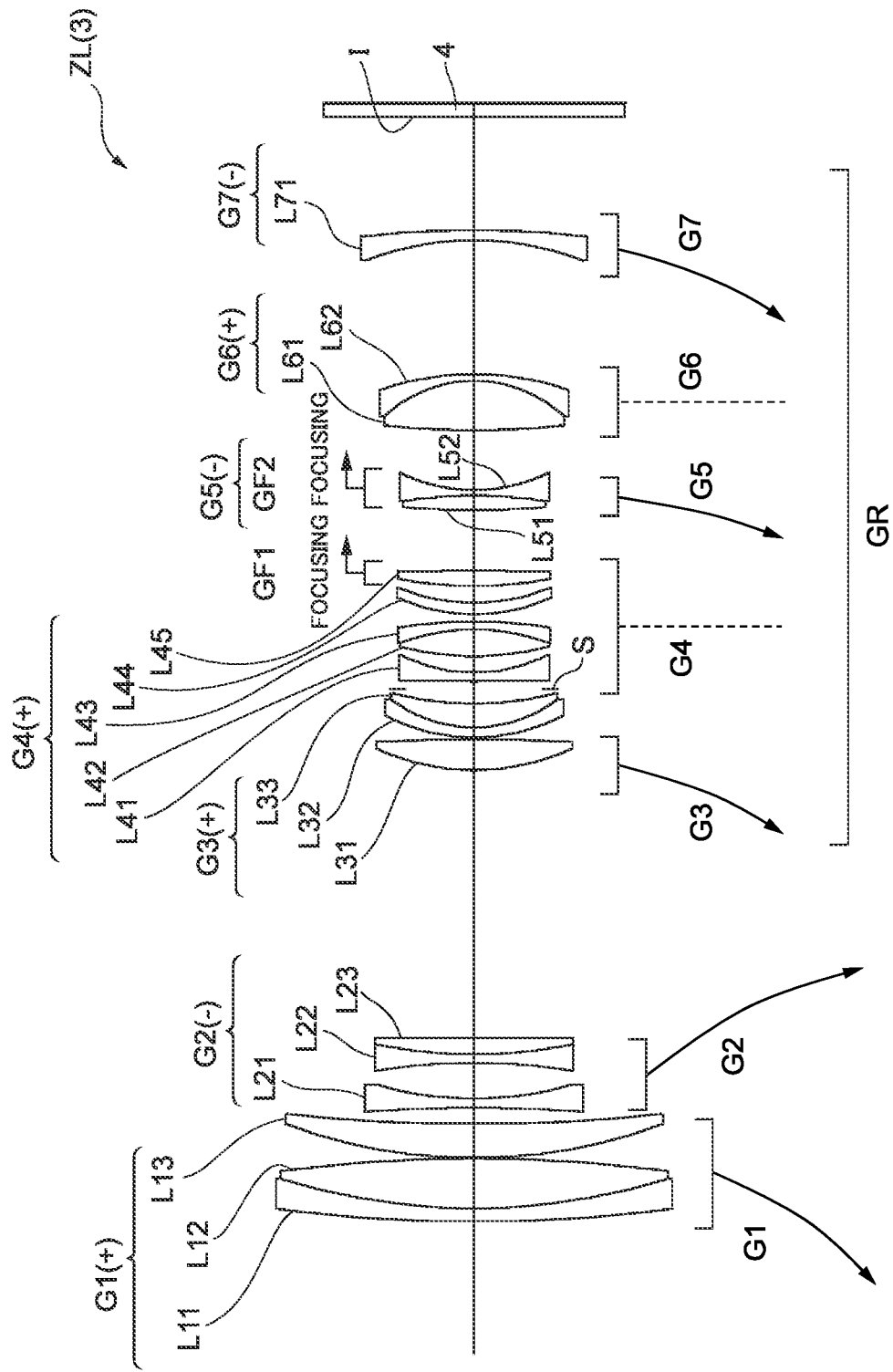
FIG. 7 shows a lens configuration of a zoom optical system according to a third example.

A third example is described with reference to FIGS. 7 to 9A, 9B and 9C and Table 3. FIG. 7 shows the lens configuration of a zoom optical system according to the third example. The zoom optical system ZL(3) according to the third example consists of, in order from the object: a first lens group G1 having a positive refractive power; a second lens group G2 having a negative refractive power; a third lens group G3 having a positive refractive power; an aperture stop S; a fourth lens group G4 having a positive refractive power; a fifth lens group G5 having a negative refractive power; a sixth lens group G6 having a positive refractive power; and a seventh lens group G7 having a negative refractive power. Note that an imaging element 4 that includes an image surface I is disposed on the image side of the seventh lens group G7.

Upon zooming from the wide-angle end state (W) to the telephoto end state (T), the first to third lens groups G1 to G3, the fifth lens group G5, and the seventh lens group G7 move in the axial direction as indicated by arrows in FIG. 7, and the distances between lens groups adjacent to each other change. Note that the fourth and sixth lens groups G4 and G6 are fixed and stationary upon zooming. Note that the lens group that consists of the third to seventh lens groups G3 to G7 corresponds to the rear group GR.

The first lens group G1 consists of, in order from the object: a cemented lens including a negative meniscus lens L11 having a convex surface facing the object, and a biconvex positive lens L12; and a positive meniscus lens L13 having a convex surface facing the object.

The second lens group G2 consists of, in order from the object: a biconcave negative lens L21; and a cemented lens including a biconcave negative lens L22, and a positive meniscus lens L23 having a convex surface facing the object.

The third lens group G3 consists of, in order from the object: a biconvex positive lens L31; and a cemented lens including a negative meniscus lens L32 having a convex surface facing the object, and a positive meniscus lens L33 having a convex surface facing the object.

The fourth lens group G4 consists of, in order from the object: an aperture stop S; a negative meniscus lens L41 having a convex surface facing the object; a cemented lens including a biconvex positive lens L42, and a negative meniscus lens L43 having a concave surface facing the object; a positive meniscus lens L44 having a convex surface facing the object; and a biconvex positive lens L45. The aperture stop S is provided on the image side of the fourth lens group G4, and moves with the fourth lens group G4 upon zooming. The positive lens L45 closest to the image constitutes a first focusing lens group GF1 that is moved upon focusing. Note that the table of [Lens Data] described later indicates that the surface distance of the surface number 23 is variable, but the distance does not change upon zooming, and when the second focusing lens group GF2 is moved for focusing, the distance changes. Preferably, configuration is made so as to move the cemented lens including the positive lens L42 and the negative meniscus lens L43, and the positive meniscus lens L44 perpendicularly to the optical axis, and thus constitute a vibration proof lens that achieves camera shake correction.

The fifth lens group G5 consists of a cemented lens including a biconvex positive lens L51 and a biconcave negative lens L52. The fifth lens group G5 constitutes a second focusing lens group GF2 that is moved upon focusing.

The sixth lens group G6 consists of a cemented lens that includes a biconvex positive lens L61, and a negative meniscus lens L62 having a concave surface facing the object.

The seventh lens group G7 consists of a negative meniscus lens L71 having a concave surface facing the object. A parallel plate PP is disposed before the image surface I.

In this example, as described above, the positive lens L45 that is in the fourth lens group G4 and is closest to the image constitutes the first focusing lens group GF1, and the fifth lens group G5 constitutes the second focusing lens group GF2. As the state of focusing on a long distance object (infinity object) is changed to the state of focusing on a short distance object, both the focusing lens groups GF1 and GF2 move toward the image as indicated by the arrows. Note that the movement trajectories are different from each other.

The following Table 3 lists values of data on the zoom optical system according to the third example.

TABLE 3

| [General Data] | | | |
|---|---|---|---|
| | W | M | T |
| F.NO | 4.13522 | 4.13658 | 4.15089 |
| 2ω | 34.0079 | 19.00672 | 12.21052 |
| Air equivalent TL | 167.955 | 187.453 | 194.407 |
| Air equivalent BF | 18.532 | 27.144 | 34.218 |

| [Lens Data] | | | |
|---|---|---|---|
| surface | R | D | nd | vd |
| 1 | 234.377 | 2.00 | 1.83400 | 37.18 |
| 2 | 97.0845 | 7.50 | 1.49700 | 81.61 |
| 3 | −226.442 | 0.10 | 1.00000 | |
| 4 | 81.4145 | 5.10 | 1.49700 | 81.61 |
| 5 | 262.943 | Variable | 1.00000 | |
| 6 | −226.35 | 1.40 | 1.80400 | 46.58 |
| 7 | 52.3491 | 5.40 | 1.00000 | |
| 8 | −91.8819 | 1.30 | 1.48749 | 70.45 |
| 9 | 72.8406 | 2.40 | 2.00069 | 25.46 |
| 10 | 4047.79 | Variable | 1.00000 | |

TABLE 3-continued

| | | | | |
|---|---|---|---|---|
| 11 | 34.7784 | 4.60 | 1.59319 | 67.87 |
| 12 | −340.051 | 0.34 | 1.00000 | |
| 13 | 28.694 | 1.50 | 1.95000 | 29.37 |
| 14 | 20.7204 | 3.63 | 1.60300 | 65.4 |
| 15 | 50.6694 | Variable | 1.00000 | |
| 16 | ∞ | 1.18 | 1.00000 | Aperture Stop |
| 17* | 570.28 | 1.30 | 1.67798 | 54.85 |
| 18 | 24.2385 | 2.47 | 1.00000 | |
| 19 | 43.9463 | 4.01 | 1.49700 | 81.61 |
| 20 | −31.9719 | 1.20 | 1.80610 | 40.98 |
| 21 | −74.7571 | 1.10 | 1.00000 | |
| 22 | 27.7311 | 1.75 | 1.76684 | 46.76 |
| 23 | 29.9997 | Variable | 1.0000 | |
| 24 | 60.5913 | 2.28 | 1.59319 | 67.87 |
| 25 | −735.683 | Variable | 1.00000 | |
| 26 | 148.715 | 2.20 | 1.84666 | 23.8 |
| 27 | −65.4915 | 0.80 | 1.76802 | 49.23 |
| 28* | 25.2641 | Variable | 1.00000 | |
| 29* | 160.588 | 7.41 | 1.69680 | 55.52 |
| 30 | −19.8672 | 1.00 | 1.80610 | 40.98 |
| 31 | −43.9193 | Variable | 1.00000 | |
| 32 | −45.2889 | 1.50 | 1.80400 | 46.58 |
| 33 | −150.000 | Variable | 1.00000 | |
| 34 | ∞ | 2.00 | 1.51680 | 63.88 |
| 35 | ∞ | 0.10 | 1.00000 | |
| Image Surface (I) | ∞ | | | |

[Aspherical Surface Data]

| Surface | κ | A4 | A6 | A8 | A10 |
|---|---|---|---|---|---|
| 17 | 1.000 | −1.76E−06 | 2.13E−10 | −8.42E−13 | 0.00E+00 |
| 28 | 1.000 | 1.38E−06 | −2.40E−08 | 2.04E−10 | −9.35E−13 |
| 29 | 1.000 | 3.99E−06 | 6.78E−09 | −2.24E−11 | 5.80E−14 |

[Lens Group Data]

| Group | First surface | Focal length |
|---|---|---|
| f1 | 1 | 153.035 |
| f2 | 6 | −58.27 |
| f3 | 11 | 40.05 |
| f4 | 17 | 602.05 |
| f5 | 26 | −43.08 |
| f6 | 29 | 58.97 |
| f7 | 32 | −81.21 |

[Variable Distance Data]

| | W | M | T | W Very short distance | M Very short distance | T Very short distance |
|---|---|---|---|---|---|---|
| Focal length | 69.48393 | 122.99632 | 193.89295 | −0.08017 | 0.13595 | −0.20886 |
| d5 | 2.43672 | 40.9882 | 66.3218 | 2.43672 | 40.9882 | 66.3218 |
| d10 | 40.4348 | 20.6034 | 1.10004 | 40.4348 | 20.6034 | 1.10004 |
| d123 | 2.16266 | 2.94747 | 4.07623 | 2.16266 | 2.94747 | 4.07623 |
| d25 | 2.50063 | 2.50063 | 2.50063 | 3.50608 | 3.94625 | 3.57887 |
| d28 | 9.19788 | 8.52466 | 3.17703 | 11.20878 | 14.30715 | 16.11589 |
| d31 | 9.03572 | 9.71207 | 15.0604 | 6.01937 | 2.48396 | 1.0433 |
| d33 | 20.19181 | 11.56998 | 4.48998 | 20.19181 | 11.56998 | 4.48998 |
| d35 | 17.11364 | 25.72577 | 32.79941 | 17.11364 | 25.72577 | 32.79941 |

[Magnification]

| | W | M | T | W Very short distance | M Very short distance | T Very short distance |
|---|---|---|---|---|---|---|
| βF1 | 0.53854 | 0.56554 | 0.635 | 0.51982 | 0.51285 | 0.51888 |
| βF2 | 3.56137 | 3.0828 | 2.8363 | 3.49135 | 2.91501 | 2.51092 |

TABLE 3-continued

[Other Data]

| | |
|---|---|
| fw | 69.484 |
| ft | 193.893 |
| Bfw | 18.532 |
| fF1 | 94.473 |
| fF2 | −43.079 |
| fr | −81.21 |
| MWF1 | 1.005 |
| MWF2 | 3.016 |

Figure 9A:
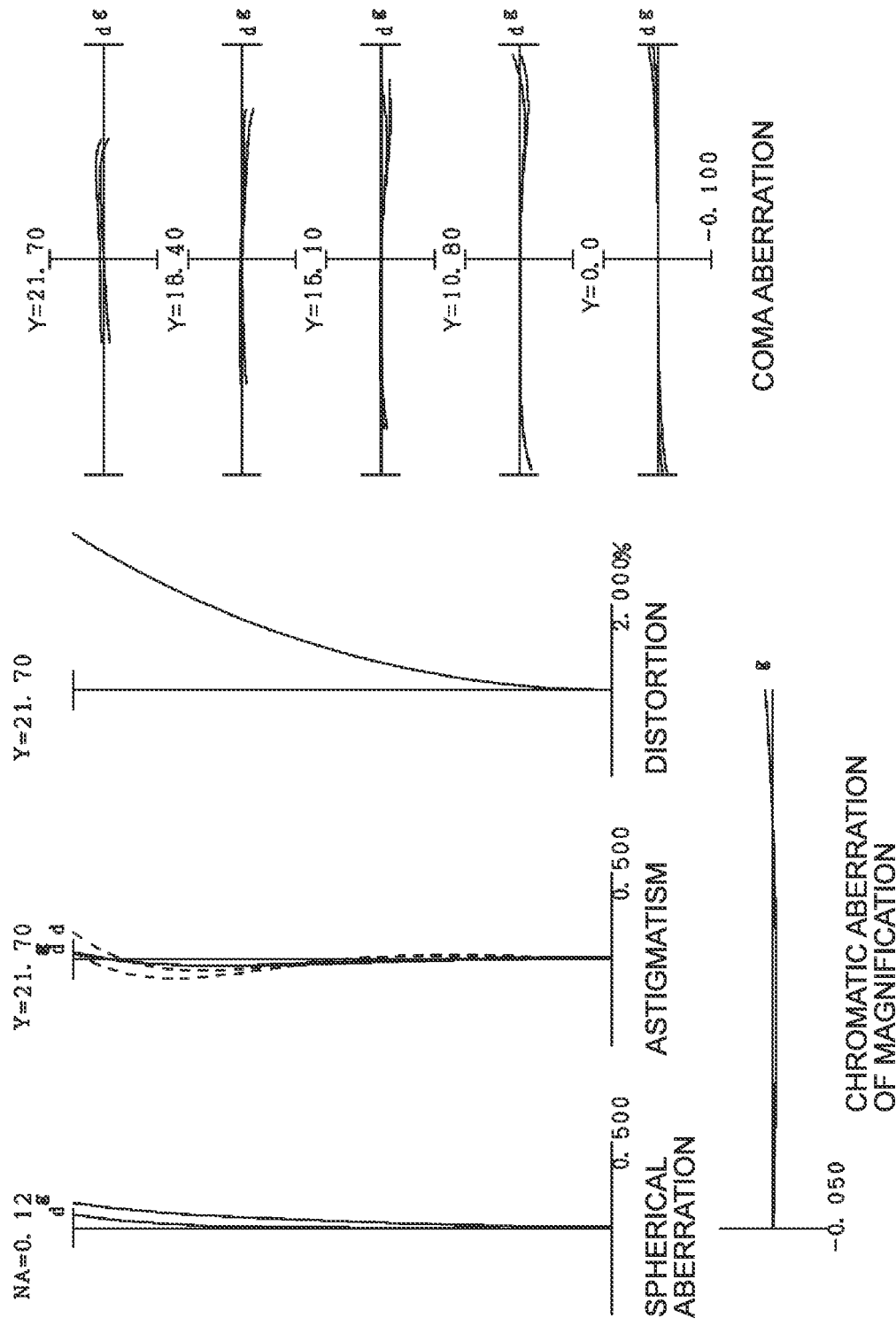
Figure 9B:
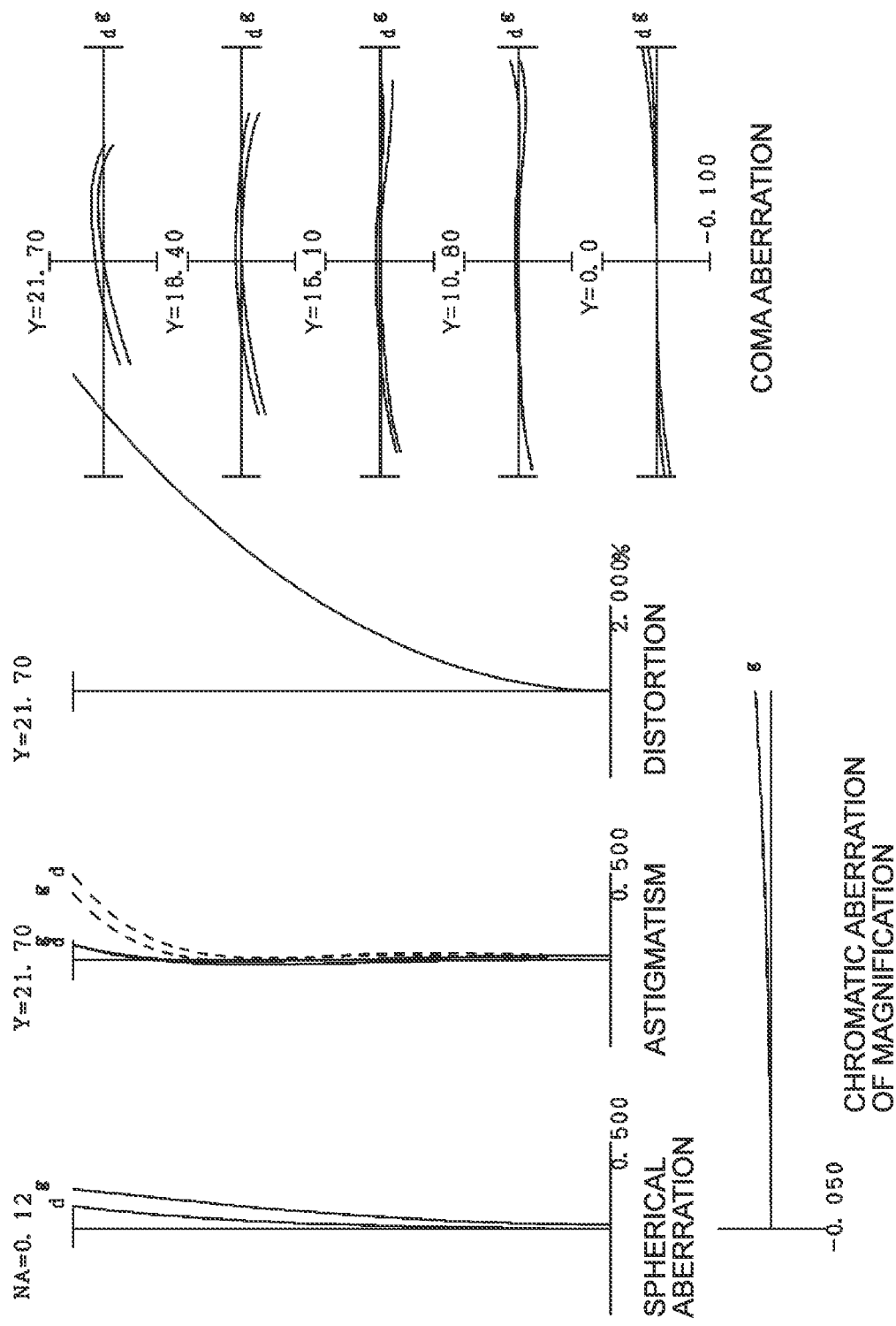

FIGS. 8A, 8B and 8C are graphs respectively showing various aberrations of the zoom optical system according to the third example upon focusing on infinity in a wide-angle end state, an intermediate focal length state, and a telephoto end state. FIGS. 9A, 9B and 9C are graphs respectively showing various aberrations of the zoom optical system according to the third example upon focusing on a very short distance object in the wide-angle end state, the intermediate focal length state, and the telephoto end state.

The graphs showing various aberrations exhibit that the zoom optical system according to the third example favorably corrects various aberrations and has an excellent imaging performance from the wide angle end state to the telephoto end state, and further has an excellent imaging performance also upon focusing on the very short distance object.

Fourth Example

Figure 10:
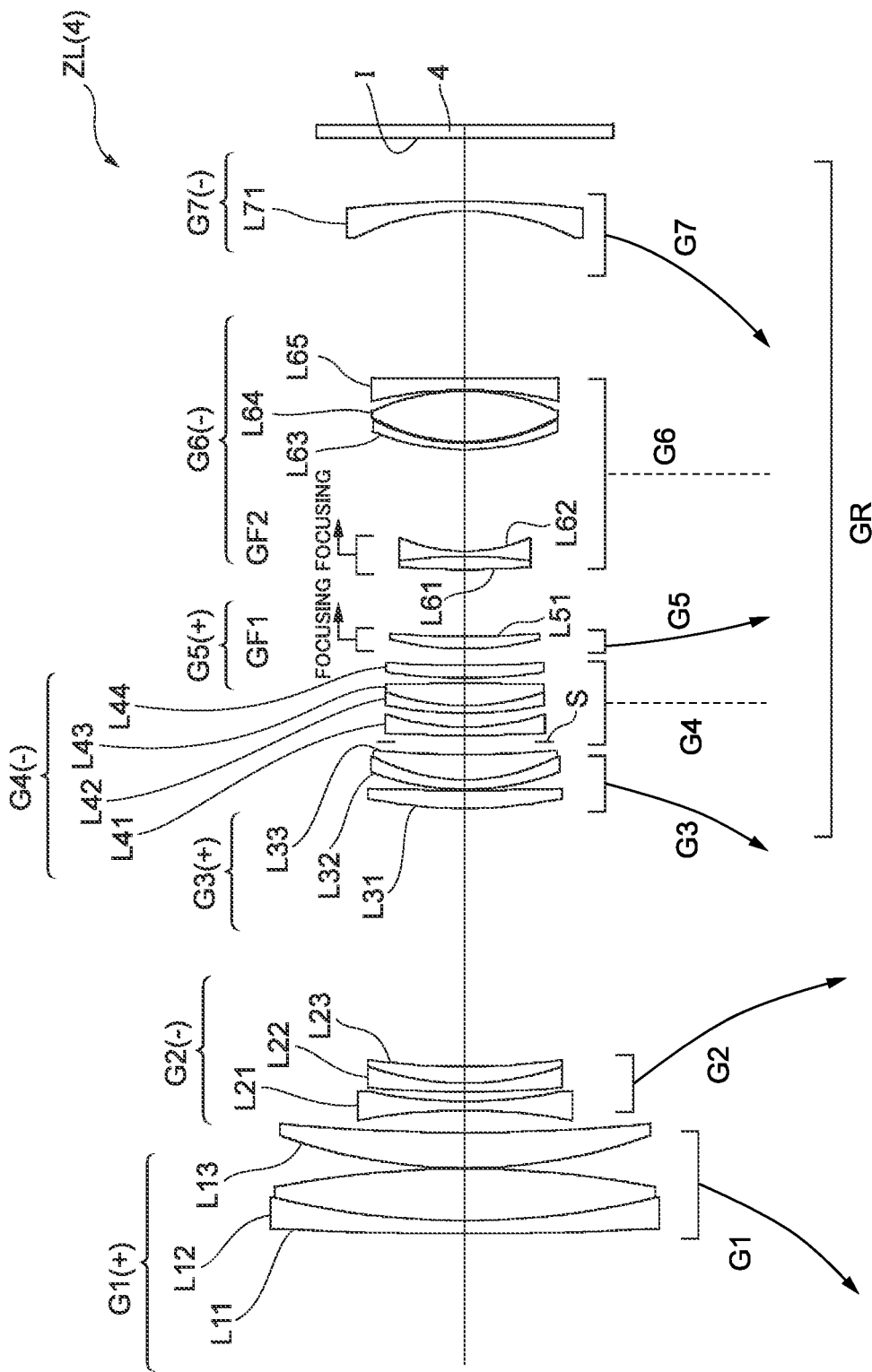
FIG. 10 shows a lens configuration of a zoom optical system according to a fourth example.

A fourth example is described with reference to FIGS. 10 to 12A, 12B and 12C and Table 4. FIG. 10 shows the lens configuration of a zoom optical system according to the fourth example. The zoom optical system ZL(4) according to the fourth example consists of, in order from the object: a first lens group G1 having a positive refractive power; a second lens group G2 having a negative refractive power; a third lens group G3 having a positive refractive power; an aperture stop S; a fourth lens group G4 having a negative refractive power; a fifth lens group G5 having a positive refractive power; a sixth lens group G6 having a negative refractive power; and a seventh lens group G7 having a negative refractive power. Note that an imaging element 4 that includes an image surface I is disposed on the image side of the seventh lens group G7.

Upon zooming from the wide-angle end state (W) to the telephoto end state (T), the first to third lens groups G1 to G3, the fifth lens group G5, and the seventh lens group G7 move in the axial direction as indicated by arrows in FIG. 10, and the distances between lens groups adjacent to each other change. Note that the fourth and sixth lens groups G4 and G6 are fixed and stationary upon zooming. Note that the lens group that consists of the third to seventh lens groups G3 to G7 corresponds to the rear group GR.

The first lens group G1 consists of, in order from the object: a cemented lens including a negative meniscus lens L11 having a convex surface facing the object, and a biconvex positive lens L12; and a positive meniscus lens L13 having a convex surface facing the object.

The second lens group G2 consists of, in order from the object: a biconcave negative lens L21; and a cemented lens including a negative meniscus lens L22 having a convex surface facing the object, and a positive meniscus lens L23 having a convex surface facing the object.

The third lens group G3 consists of, in order from the object: a positive meniscus lens L31 having a convex surface facing the object; and a cemented lens including a negative meniscus lens L32 having a convex surface facing the object, and a positive meniscus lens L33 having a convex surface facing the object.

The fourth lens group G4 consists of, in order from the object: an aperture stop S; a negative meniscus lens L41 having a convex surface facing the object; a cemented lens including a negative meniscus lens L42 having a convex surface facing the object, and a biconvex positive lens L43; and a positive meniscus lens L44 having a convex surface facing the object. The aperture stop S is provided on the image side of the fourth lens group G4, and moves with the fourth lens group G4 upon zooming. Preferably, configuration is made so as to move the cemented lens including the negative meniscus lens L42 and the positive lens L43, and the positive meniscus lens L44 perpendicularly to the optical axis, and thus constitute a vibration proof lens that achieves camera shake correction.

The fifth lens group G5 consists of a positive meniscus lens L51 having a convex surface facing the object. The fifth lens group G5 constitutes a first focusing lens group GF1 that is moved upon focusing.

The sixth lens group G6 consists of, in order from the object: a cemented lens including a biconvex positive lens L61, and a biconcave negative lens L62; a negative meniscus lens L63 having a convex surface facing the object; a biconvex positive lens L64; and a biconcave negative lens L65. The cemented lens including the biconvex positive lens L61 and the biconcave negative lens L62 constitutes the second focusing lens group GF2 that is moved upon focusing. Note that the table of [Lens Data] described later indicates that the surface distance of the surface number 28 is variable, but the distance does not change upon zooming, and when the second focusing lens group GF2 is moved for focusing, the distance changes.

The seventh lens group G7 consists of a negative meniscus lens L71 having a concave surface facing the object. A parallel plate PP is disposed before the image surface I.

In this example, as described above, the fifth lens group G5 constitutes the first focusing lens group GF1, and the cemented lens that includes the biconvex positive lens L61 and biconcave negative lens L62 and is disposed on the object side of the sixth lens group G6 constitutes the second focusing lens group GF2. As the state of focusing on a long distance object (infinity object) is changed to the state of focusing on a short distance object, both the focusing lens groups GF1 and GF2 move toward the image as indicated by the arrows. Note that the movement trajectories are different from each other.

The following Table 4 lists values of data on the zoom optical system according to the fourth example.

TABLE 4

| [General Data] | | | |
| --- | --- | --- | --- |
| | W | M | T |
| F.NO | 4.1497 | 4.12738 | 4.10277 |
| 2ω | 34.12502 | 19.2871 | 12.14344 |
| Air equivalent TL | 169.45464 | 187.46147 | 197.45586 |
| Air equivalent BF | 11.15474 | 16.97645 | 24.33136 |

| [Lens Data] | | | | |
| --- | --- | --- | --- | --- |
| surface | R | D | nd | νd |
| 1 | 554.111 | 1.99 | 1.83400 | 37.18 |
| 2 | 121.117 | 7.95 | 1.49700 | 81.61 |
| 3 | −154.679 | 0.10 | 1.00000 | |
| 4 | 82.3981 | 5.45 | 1.49700 | 81.61 |
| 5 | 300.000 | Variable | 1.00000 | |
| 6 | −89.8369 | 1.39 | 1.75500 | 52.36 |
| 7 | 72.7319 | 1.48 | 1.00000 | |
| 8 | 169.21 | 1.29 | 1.61800 | 63.32 |
| 9 | 43.4531 | 2.58 | 2.00069 | 25.46 |
| 10 | 105.254 | Variable | 1.00000 | |
| 11 | 72.6136 | 2.81 | 1.59319 | 67.87 |
| 12 | 630.043 | 0.10 | 1.00000 | |
| 13 | 39.6925 | 1.49 | 1.83481 | 42.75 |
| 14 | 29.7546 | 3.87 | 1.59319 | 67.87 |
| 15 | 153.618 | Variable | 1.00000 | |
| 16 | ∞ | 1.01 | 1.00000 | Aperture Stop |
| 17 | 255.742 | 1.29 | 1.72825 | 28.38 |
| 18 | 38.3739 | 2.14 | 1.00000 | |
| 19 | 62.1964 | 1.19 | 1.85000 | 27.03 |
| 20 | 36.9077 | 3.39 | 1.51680 | 63.88 |
| 21 | −312.986 | 0.78 | 1.00000 | |
| 22 | 75.7193 | 2.01 | 1.90265 | 35.72 |
| 23 | 209.183 | Variable | 1.00000 | |
| 24 | 45.8893 | 1.90 | 1.75500 | 52.36 |
| 25 | 154.217 | Variable | 1.00000 | |
| 26 | 117.662 | 2.00 | 1.84666 | 23.8 |
| 27 | −84.4172 | 0.79 | 1.71999 | 50.24 |
| 28 | 24.8653 | Variable | 1.00000 | |
| 29 | 38.098 | 1.00 | 1.90265 | 35.72 |
| 30 | 29.1903 | 0.21 | 1.00000 | |
| 31 | 29.368 | 7.78 | 1.51680 | 63.88 |
| 32 | −34.236 | 0.16 | 1.00000 | |
| 33 | −58.6977 | 1.70 | 1.75500 | 52.36 |
| 34 | 1488.85 | Variable | 1.00000 | |
| 35 | −36.7886 | 1.50 | 1.77250 | 49.61 |
| 36 | −150.000 | Variable | 1.00000 | |
| 37 | ∞ | 2.00 | 1.51680 | 63.88 |
| 38 | ∞ | 0.10 | 1.00000 | |
| Image Surface (I) | ∞ | | | |

| [Lens Group Data] | | |
| --- | --- | --- |
| Group | First surface | Focal length |
| f1 | 1 | 156.21 |
| f2 | 6 | −62.97 |
| f3 | 11 | 60.19 |
| f4 | 17 | −694.45 |
| f5 | 24 | 85.88 |
| f6 | 26 | −253.27 |
| f7 | 35 | −63.46 |

TABLE 4-continued

[Variable Distance Data]

|  | W | M | T | W Very short distance | M Very short distance | T Very short distance |
|---|---|---|---|---|---|---|
| Focal length | 72.007 | 122.99682 | 193.99136 | −0.08258 | −0.13692 | −0.2071 |
| d5 | 3.3891 | 39.252 | 62.9142 | 3.3891 | 39.252 | 62.9142 |
| d10 | 39.6077 | 19.165 | 1.08983 | 39.6077 | 19.165 | 1.08983 |
| d15 | 1.90568 | 4.49493 | 8.90891 | 1.90568 | 4.49493 | 8.90891 |
| d23 | 2.50001 | 4.30027 | 10.75681 | 6.3024 | 5.41764 | 11.81545 |
| d25 | 10.2319 | 8.42371 | 1.95605 | 12.13309 | 14.01054 | 14.65975 |
| d28 | 15.6253 | 15.6253 | 15.6253 | 9.92172 | 8.9211 | 1.86296 |
| d34 | 25.71179 | 19.89539 | 12.53498 | 25.71179 | 19.89539 | 12.53498 |
| d36 | 9.73618 | 15.55788 | 22.91866 | 9.73618 | 15.55788 | 22.91866 |

[Magnification]

|  | W | M | T | W Very short distance | M Very short distance | T Very short distance |
|---|---|---|---|---|---|---|
| βF1 | 0.44457 | 0.47652 | 0.56971 | 0.4298 | 0.42123 | 0.44706 |
| βF2 | 3.05967 | 2.89463 | 2.65901 | 2.946 | 2.76102 | 2.38474 |

[Other Data]

| | |
|---|---|
| fw | 72.007 |
| ft | 193.991 |
| Bfw | 11.155 |
| fF1 | 85.880052 |
| fF2 | −50.17732 |
| fr | −63.46 |
| MWF1 | 3.802 |
| MWF2 | 5.704 |

Figure 11A:
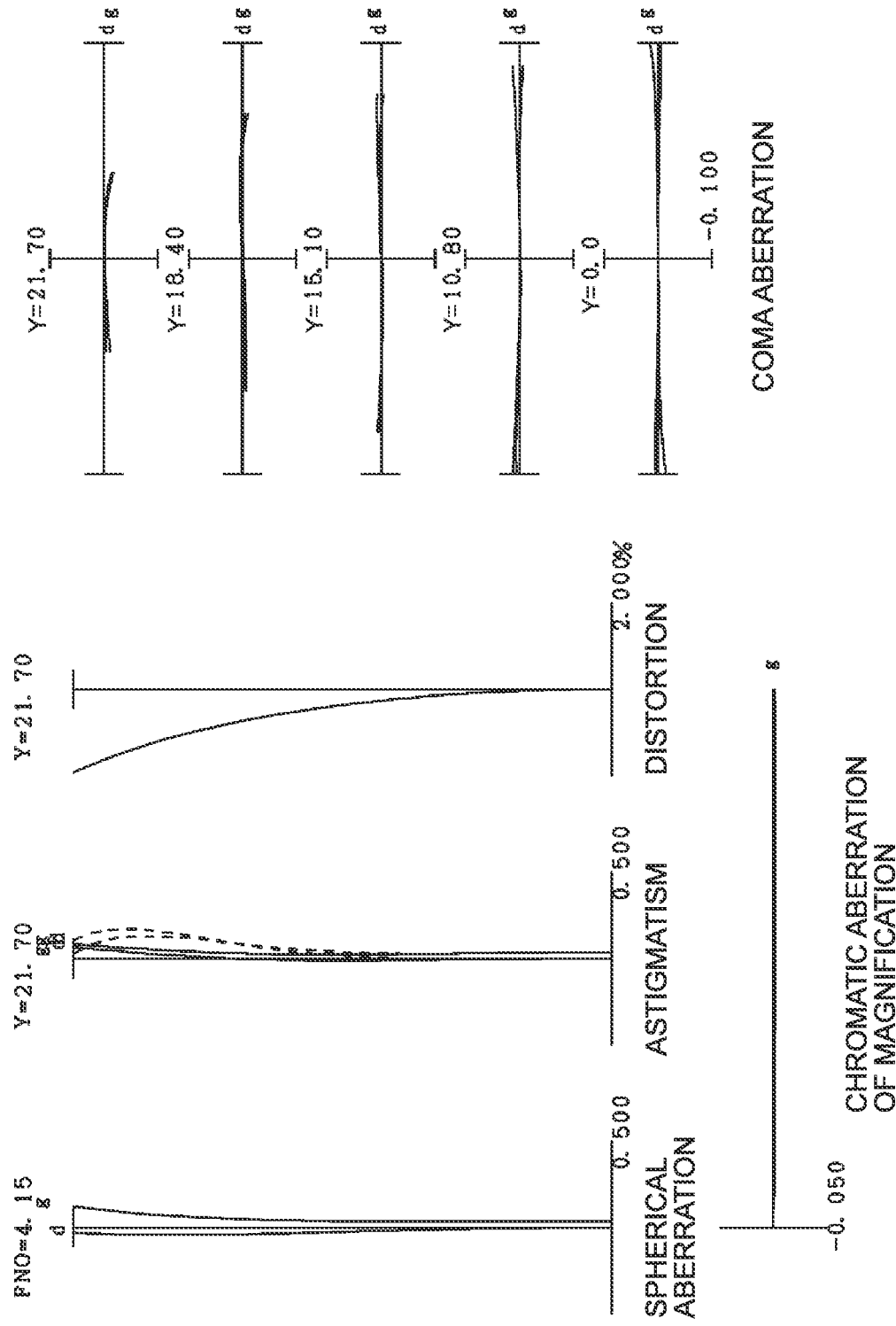
Figure 11C:
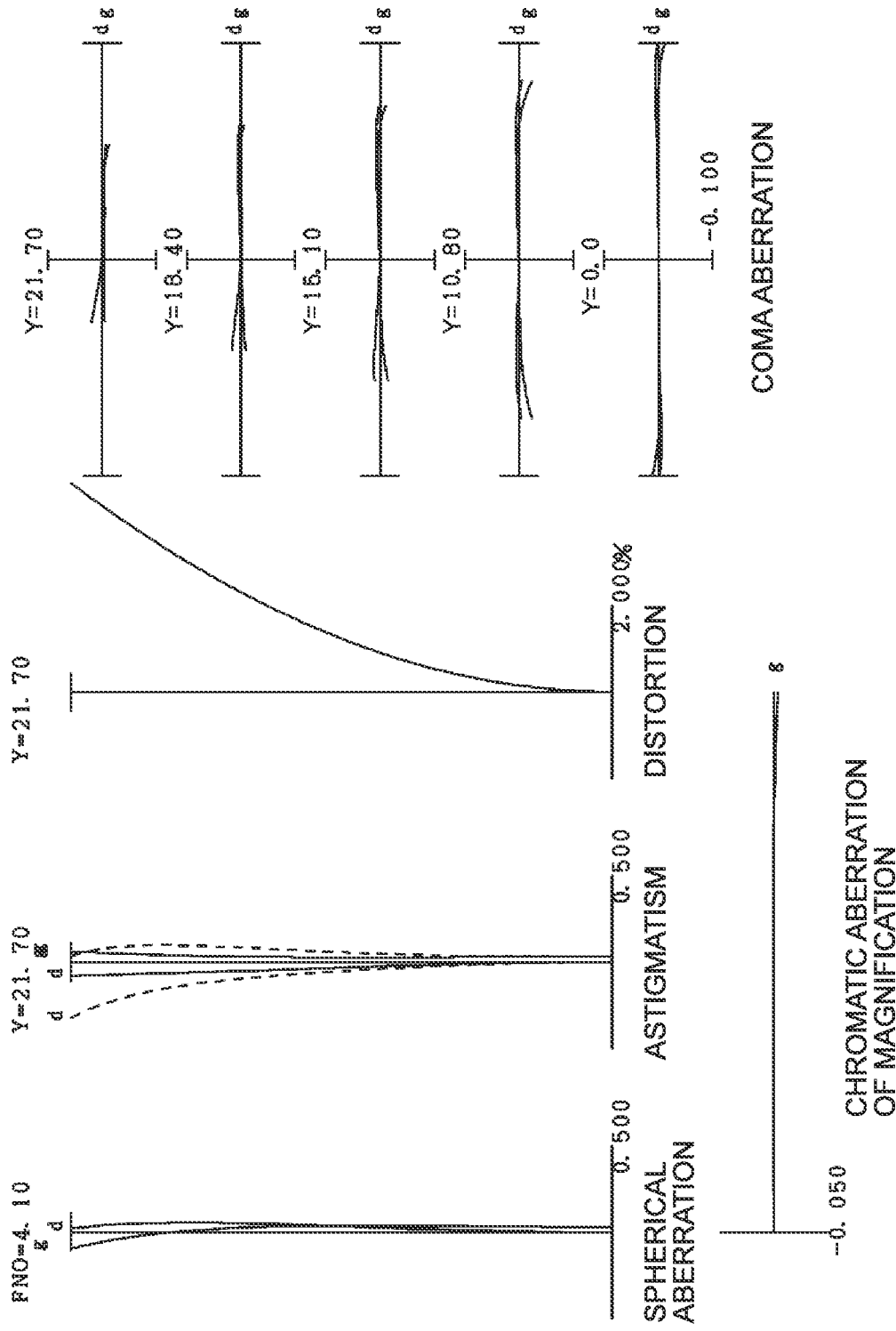
Figure 12B:
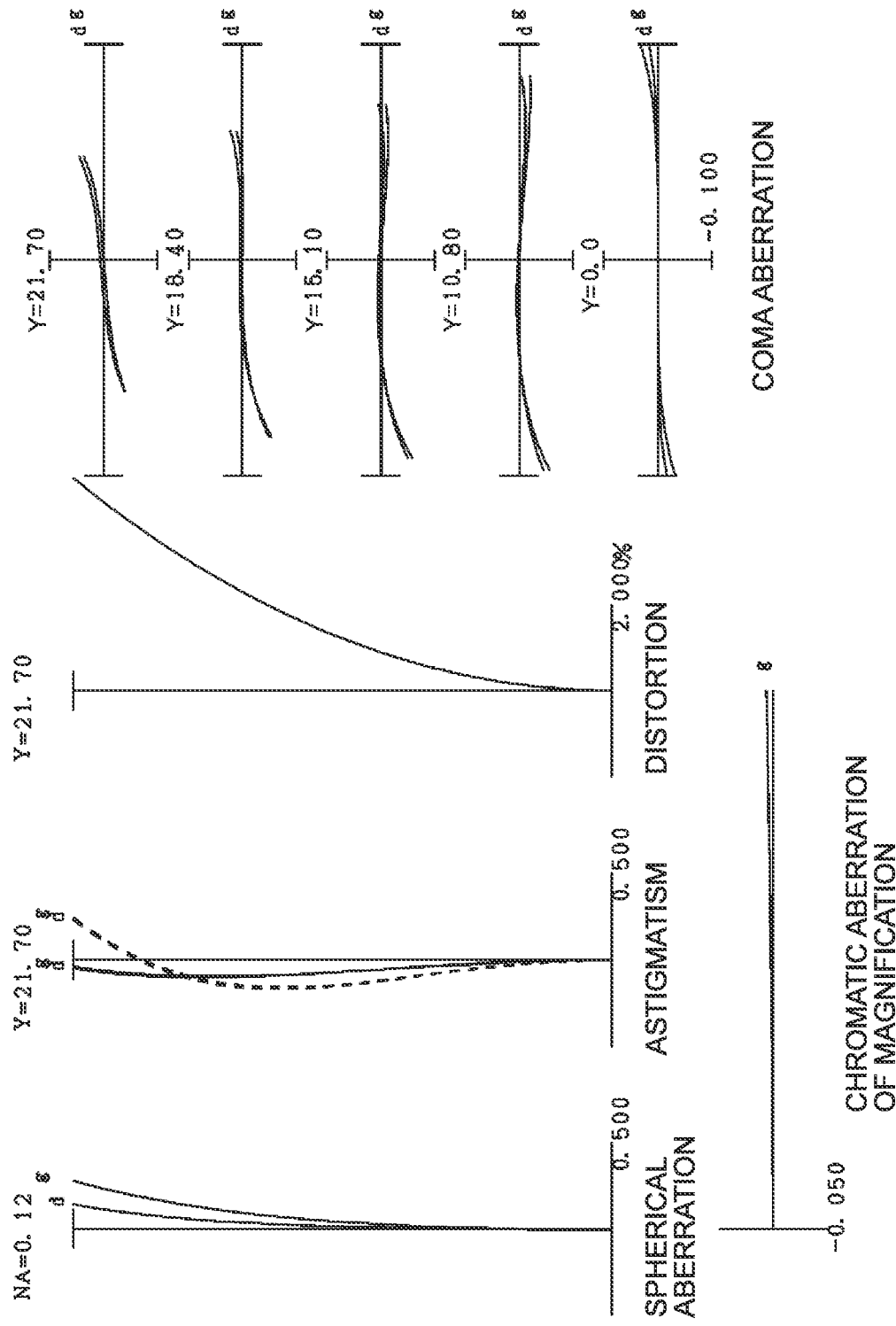

FIGS. 11A, 11B and 11C are graphs respectively showing various aberrations of the zoom optical system according to the fourth example upon focusing on infinity in a wide-angle end state, an intermediate focal length state, and a telephoto end state. FIGS. 12A, 12B and 12C are graphs respectively showing various aberrations of the zoom optical system according to the fourth example upon focusing on a very short distance object in the wide-angle end state, the intermediate focal length state, and the telephoto end state.

The graphs showing various aberrations exhibit that the zoom optical system according to the fourth example favorably corrects various aberrations and has an excellent imaging performance from the wide angle end state to the telephoto end state, and further has an excellent imaging performance also upon focusing on the very short distance object.

Lastly, the table of [Conditional Expression Corresponding Value] is shown below. This table collectively indicates values corresponding to the conditional expressions (1) to (11) with respect to all the examples (first to fifth examples).

$1.10 < f2/fF2 < 2.00$  Conditional expression (1)

$0.30 < f1/fF1 < 2.50$  Conditional expression (2)

$0.60 < fr/fF2 < 3.00$  Conditional expression (3)

$1.30 < fF1/(-fF2) < 10.00$  Conditional expression (4)

$0.01 < MWF1/MWF2 < 1.00$  Conditional expression (5)

$60.00 < vp$  Conditional expression (6)

$0.10 < \beta F1w < 0.80$  Conditional expression (7)

$0.10 < 1/\beta F2w < 0.60$  Conditional expression (8)

$(\beta F1w+1/\beta F1w)^{-2} < 0.25$  Conditional expression (9)

$(\beta F2w+1/\beta F2w)^{-2} < 0.15$  Conditional expression (10)

$15.00° < 2\omega w < 45.00°$  Conditional expression (11)

$0.05 < Bfw/fw < 0.35$  Conditional expression (12)

[Conditional Expression Corresponding Value]

| Conditional Expression | 1st Example | 2nd Example | 3rd Example | 4th Example |
|---|---|---|---|---|
| (1) | 1.196 | 1.393 | 1.353 | 1.255 |
| (2) | 1.575 | 2.022 | 1.620 | 1.819 |
| (3) | 1.225 | 1.328 | 1.885 | 1.265 |
| (4) | 1.899 | 1.660 | 2.193 | 1.712 |
| (5) | 0.500 | 0.667 | 0.333 | 0.667 |
| (6) | 81.61 | 81.61 | 81.61 | 81.61 |
| (7) | 0.471 | 0.403 | 0.539 | 0.445 |
| (8) | 0.289 | 0.286 | 0.281 | 0.327 |
| (9) | 0.148 | 0.120 | 0.174 | 0.138 |
| (10) | 0.071 | 0.070 | 0.068 | 0.087 |
| (11) | 34.158 | 34.239 | 34.008 | 34.125 |
| (12) | 0.155 | 0.155 | 0.267 | 0.155 |

The first to fourth examples described above show specific examples of this embodiment. This embodiment is not limited to these examples.

Note that the following content can be adopted in a range without impairing the optical performance of the zoom optical system according to this embodiment.

As numerical examples of the zoom optical systems, those having the seven- and eight-group structures are described. However, the present application is not limited thereto. A zoom optical system having another group configuration (e.g., a nine-group structure etc.) may be made. Specifically, a configuration may be adopted where a lens or a lens group is added to a place closest to the object or a place closest to the image surface in the zoom optical system. Note that the lens group indicates a portion that includes at least one lens separated by air distances that change during zooming.

The lens surface may be made of a spherical surface or a planar surface, or an aspherical surface. A case where the lens surface is a spherical surface or a planar surface is preferable, because lens processing, and assembling and adjustment are facilitated, and the optical performance degradation due to errors caused by processing and assembling and adjustment can be prevented. It is also preferable because the degradation in representation performance even with the image surface being misaligned is small.

In the cases where the lens surface is an aspherical surface, the aspherical surface may be any of an aspherical surface made by a grinding process, a glass mold aspherical surface made by forming glass into an aspherical shape with a mold, and a composite type aspherical surface made by forming a resin on a surface of glass into an aspherical shape. The lens surface may be a diffractive surface. The lens may be a gradient-index lens (GRIN lens), or a plastic lens.

As to the aperture stop, a member as the aperture stop is not necessarily provided, and a lens frame may replace the member to function instead.

An antireflection film having a high transmissivity in a wide wavelength region may be applied onto each lens surface in order to reduce flares and ghosts and achieve optical performances having a high contrast. This can reduce flares and ghosts, and achieve optical performances having a high contrast.

Explanation of Numerals and Characters

| | |
|---|---|
| G1 First lens group | G2 Second lens group |
| G3 Third lens group | G4 Fourth lens group |
| G5 Fifth lens group | G6 Sixth lens group |
| G7 Seventh lens group | G8 Eighth lens group |
| GR Rear group | S Aperture stop |
| GF1 First focusing lens group | GF2 Second focusing lens group |
| I Image surface | 4 Imaging element |

The invention claimed is:

1. A zoom optical system consisting of, in order from an object on an optical axis: a first lens group having a positive refractive power; a second lens group having a negative refractive power; and a rear group that includes a plurality of lens groups, wherein
the rear group comprises a first focusing lens group having a positive refractive power, and a second focusing lens group having a negative refractive power,
upon zooming from a wide angle end to a telephoto end, distances between lens groups adjacent to each other among the first lens group, the second lens group, and the plurality of lens groups change,
upon focusing from an infinity object to a short distance object, the first focusing lens group and the second focusing lens group move toward an image along movement trajectories different from each other,
the rear group comprises a lens group movable in a direction perpendicular to the optical axis, on an object side of the first focusing lens group, and
the following conditional expressions are satisfied:

$$1.10 < f2/fF2 < 2.00$$

$$0.60 < fr/fF2 < 3.00$$

where f2: a focal length of the second lens group,
fF2: a focal length of the second focusing lens group, and
fr: a focal length of a final lens group disposed closest to the image.

2. The zoom optical system according to claim 1, wherein the following conditional expression is satisfied:

$$0.30 < f1/fF1 < 2.50$$

where f1: a focal length of the first lens group, and
fF1: a focal length of the first focusing lens group.

3. The zoom optical system according to claim 1, wherein the first focusing lens group consists of one positive lens.

4. The zoom optical system according to claim 1, wherein the following conditional expression is satisfied:

$$1.30 < fF1/(-fF2) < 10.00$$

where fF1: a focal length of the first focusing lens group.

5. The zoom optical system according to claim 1, wherein the following conditional expression is satisfied:

$$0.01 < MWF1/MWF2 < 1.00$$

where MWF1: an amount of movement of the first focusing lens group upon focusing from the infinity object to the short distance object in a wide angle end state,
MWF2: an amount of movement of the second focusing lens group upon focusing from the infinity object to the short distance object in the wide angle end state, and movement toward an image surface is chosen to be positive.

6. The zoom optical system according to claim 1, wherein the second focusing lens group consists of one positive lens, and one negative lens.

7. The zoom optical system according to claim 1, wherein the first lens group comprises at least one positive lens, the following conditional expression is satisfied:

$$60.00 < vp$$

where vp: an Abbe number of the positive lens.

8. The zoom optical system according to claim 1, wherein the following conditional expression is satisfied:

$$0.10 < BF1w < 0.80$$

where BF1w: a lateral magnification of the first focusing lens group in a wide angle end state.

9. The zoom optical system according to claim 1, wherein the following conditional expression is satisfied:

$$0.10 < 1/BF2w < 0.60$$

where BF2w: a lateral magnification of the second focusing lens group in a wide angle end state.

10. The zoom optical system according to claim 1, wherein the following conditional expression is satisfied:

$$(BF1w+1/BF1w)^{-2} < 0.25$$

where BF1w: a lateral magnification of the first focusing lens group in a wide angle end state.

11. The zoom optical system according to claim 1, wherein the following conditional expression is satisfied:

$$(BF2w+1/BF2w)^{-2}<0.15$$

where BF2w: a lateral magnification of the second focusing lens group in a wide angle end state.

12. The zoom optical system according to claim 1, wherein
the following conditional expression is satisfied:

$$13.00°<2\omega w<45.00°$$

where 2ωw: a full angle of view [°] of the zoom optical system in a wide angle end state.

13. The zoom optical system according to claim 1, wherein
the following conditional expression is satisfied:

$$0.05<Bfw/fw<0.35$$

where Bfw: a back focus in a wide angle end state, and
fw: a focal length of the zoom optical system in the wide angle end state.

14. An optical apparatus comprising the zoom optical system according to claim 1.

15. A method for manufacturing a zoom optical system consisting of, in order from an object on an optical axis: a first lens group having a positive refractive power; a second lens group having a negative refractive power; and a rear group that includes a plurality of lens groups;
the method comprising a step of arranging the first lens group, the second lens group and the rear group in a lens barrel so that:
the rear group comprises a first focusing lens group having a positive refractive power, and a second focusing lens group having a negative refractive power,
upon zooming from a wide angle end to a telephoto end, distances between lens groups adjacent to each other among the first lens group, the second lens group, and the plurality of lens groups, change,
upon focusing from an infinity object to a short distance object, the first focusing lens group and the second focusing lens group move toward an image along movement trajectories different from each other,
the rear group comprises a lens group movable in a direction perpendicular to the optical axis, on an object side of the first focusing lens group, and
the following conditional expressions are satisfied:

$$1.10<f2/fF2<2.00$$

$$0.60<fr/fF2<3.00$$

where f2: a focal length of the second lens group,
fF2: a focal length of the second focusing lens group, and
fr: a focal length of a final lens group disposed closest to the image.

16. A zoom optical system consisting of, in order from an object on an optical axis: a first lens group having a positive refractive power; a second lens group having a negative refractive power; and a rear group that includes a plurality of lens groups, wherein
the rear group comprises a first focusing lens group having a positive refractive power, and a second focusing lens group having a negative refractive power,
upon zooming from a wide angle end to a telephoto end, distances between lens groups adjacent to each other among the first lens group, the second lens group, and the plurality of lens groups change,
upon focusing from an infinity object to a short distance object, the first focusing lens group and the second focusing lens group move toward an image along movement trajectories different from each other,
the rear group comprises a lens group movable in a direction perpendicular to the optical axis, on an object side of the first focusing lens group, and
the following conditional expressions are satisfied:

$$1.10<f2/fF2<2.00$$

$$0.05<Bfw/fw<0.35$$

where f2: a focal length of the second lens group,
fF2: a focal length of the second focusing lens group,
Bfw: a back focus in a wide angle end state, and
fw: a focal length of the zoom optical system in the wide angle end state.

* * * * *